(12) United States Patent
Yoon et al.

(10) Patent No.: US 9,531,249 B2
(45) Date of Patent: Dec. 27, 2016

(54) VOLTAGE CONVERTER AND POWER MANAGEMENT DEVICE INCLUDING THE SAME

(71) Applicant: Samsung Electronics Co., Ltd., Suwon-Si, Gyeonggi-Do (KR)

(72) Inventors: Je-Hyung Yoon, Seoul (KR); Ha-Neul Kim, Seoul (KR); Hyoung-Seok Oh, Seoul (KR); Kyoung-Jin Lee, Seoul (KR); Sang-Ik Cho, Seongdong-gu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 241 days.

(21) Appl. No.: 14/518,175

(22) Filed: Oct. 20, 2014

(65) Prior Publication Data
US 2015/0214827 A1    Jul. 30, 2015

(30) Foreign Application Priority Data
Jan. 28, 2014  (KR) ........................ 10-2014-0010432

(51) Int. Cl.
*H02M 3/156* (2006.01)
*H02M 3/158* (2006.01)
*H02M 1/14* (2006.01)
*H02M 1/00* (2006.01)

(52) U.S. Cl.
CPC ............... *H02M 1/14* (2013.01); *H02M 3/156* (2013.01); *H02M 3/1588* (2013.01); *H02M 2001/0009* (2013.01); *H02M 2001/0032* (2013.01)

(58) Field of Classification Search
CPC ................ H02M 3/156; H02M 3/1588; H02M 2001/009; H02M 2001/0032
See application file for complete search history.

(56) References Cited

U.S. PATENT DOCUMENTS

| | | | |
|---|---|---|---|
| 5,773,966 | A | 6/1998 | Steigerwald |
| 7,061,213 | B2 | 6/2006 | Yoshida |
| 7,567,065 | B2 | 7/2009 | Matsuo et al. |
| 7,629,782 | B2 | 12/2009 | Naka |
| 8,035,365 | B2 | 10/2011 | Kikuchi |

(Continued)

FOREIGN PATENT DOCUMENTS

| | | |
|---|---|---|
| JP | 2008079378 A | 4/2008 |
| JP | 2013021816 A | 1/2013 |

*Primary Examiner* — Timothy J Dole
*Assistant Examiner* — Ishrat Jamali
(74) *Attorney, Agent, or Firm* — Harness, Dickey & Pierce

(57) ABSTRACT

A voltage converter includes a driving device unit, a current sensing unit and a switching control circuit. The driving device unit charges an input power supply voltage in an inductor, connected between a switching node and an output node, in response to a first driving control signal, and discharges the inductor in response to a second driving control signal. The current sensing unit generates first and second sensing signals based on a first sensed current, a second sensed current, a voltage at the switching node and a ground voltage. The switching control circuit generates the first and second driving control signals by performing a pulse-frequency modulation (PFM) and a pulse-width modulation (PWM) based on a feedback voltage, a reference voltage and the first and second sensing signals. The switching control circuit adaptively adjusts off-time when the switching control circuit performs the PFM.

18 Claims, 17 Drawing Sheets

(56) References Cited

U.S. PATENT DOCUMENTS

| | | |
|---|---|---|
| 8,067,929 B2 | 11/2011 | Huang et al. |
| 8,199,539 B2 | 6/2012 | Wang et al. |
| 8,258,765 B2 | 9/2012 | Nishida |
| 8,410,762 B2 | 4/2013 | Ueno et al. |
| 2009/0174384 A1 | 7/2009 | Michishita et al. |
| 2010/0056610 A1* | 3/2010 | Peters ............... C12Q 1/42 514/44 A |
| 2010/0320983 A1* | 12/2010 | Wu ............... H02M 3/1584 323/283 |
| 2013/0093407 A1 | 4/2013 | Heo et al. |
| 2014/0266110 A1* | 9/2014 | Yuan ............... H02M 3/156 323/282 |

\* cited by examiner

VOLTAGE CONVERTER AND POWER MANAGEMENT DEVICE INCLUDING THE SAME

CROSS-REFERENCE TO RELATED APPLICATION

This application claims priority under 35 USC §119 to Korean Patent Application No. 10-2014-0010432, filed on Jan. 28, 2014 in the Korean Intellectual Property Office (KIPO), the content of which are herein incorporated by reference in its entirety.

BACKGROUND

1. Technical Field

Example embodiments relate generally to power supply devices, and more particularly to voltage converters and power management device including the same.

2. Description of the Related Art

Generally, power supply devices are needed to supply voltage for operation of electronic devices. One type of the power supply devices is a voltage converter, such as a DC-DC converter. DC-DC converters are used in various types of electronic devices to provide a stable power supply voltage. A pulse-width modulation (PWM) has become a widely-used technique for controlling the DC-DC converters by adjusting a current through an inductor.

SUMMARY

Some example embodiments provide a voltage converter, capable of increasing power transfer efficiency and performing stable mode transition.

Some example embodiments provide a power management device including the voltage converter.

According to some example embodiments, a voltage converter includes a driving device unit, a current sensing unit and a switching control circuit. The driving device unit charges an input power supply voltage in an inductor in response to a first driving control signal, the inductor being connected between a switching node and an output node, and the driving device being configured to discharge the inductor in response to a second driving control signal. The current sensing unit generates first and second sensing signals based on a first sensed current, a second sensed current, a voltage at the switching node and a ground voltage. The first sensed current is based on a current which is responsive to the input power supply voltage. The second sensed current is inversely proportional to an inductor current flowing through the inductor. The first sensing signal indicates a peak value of the inductor current, and the second sensing signal indicates a zero value of the inductor current. The switching control circuit generates the first and second driving control signals by performing a pulse-frequency modulation (PFM) and a pulse-width modulation (PWM) based on a feedback voltage, a reference voltage, the first sensing signal and the second sensing signal. The feedback voltage is obtained by dividing an output voltage at the output node. The switching control circuit adaptively adjusts off-time when the switching control circuit performs the PFM. The first driving control signal is deactivated during the off-time.

In some embodiments, the switching control circuit may operate in a pulse-frequency modulation (PFM) mode when the peak value is less than a reference value.

In some embodiments, the switching control circuit may operate in a pulse-width modulation (PWM) mode when the peak value is equal to or greater than a reference value.

In some embodiments, the current sensing unit may include a current sensor that generates the first sensing signal based on the first and second sensed currents, and a zero-current detector that generates the second sensing signal based on a first voltage signal corresponding to a voltage at the switching node and a second voltage signal having a level of the ground voltage.

The current sensor may include a peak current sensing unit that generates a peak current detection signal based on the first and second sensed current, and a buffer unit that receives the peak current detection signal, buffers the peak current detection signal and provides the first sensing signal.

The zero-current detector is configured to amplify a difference between the first and second voltage signals to provide the second sensing signal.

In some embodiments, the switching control circuit may include a feedback voltage selector that receives the first sensing signal to select a providing path of the feedback voltage according to a peak value of the first sensing signal, a pulse-width modulation (PWM) unit that receives a first reference voltage, the feedback voltage and the first sensing signal, and performs the PWM according to a difference between the first reference voltage and the feedback voltage to generate a first pulse signal, a pulse-frequency modulation (PFM) unit that receives the first reference voltage and the feedback voltage, and performs the PFM according to a difference between the first reference voltage and the feedback voltage to generate a second pulse signal, a first level detector that receives the first sensing signal to generate a peak pulse signal which is activated when the peak value of the first sensing signal is detected, an off-time controller that provides the PFM unit with an off-timing control voltage that adjusts a frequency of the second pulse signal, a mode controller that selects one of the first and second pulse signals according to an operation mode based on the first and second sensing signals, and a driving control unit that determines on and off timings of the first and second driving control signals based on a selected pulse signal of the mode controller.

The PFM unit may is configured to adaptively adjust the frequency of the second pulse based on the off-timing control voltage and the first sensing signal in a PFM mode.

The PFM unit may include a first comparator that compares the feedback voltage and the first reference voltage to output a first error voltage, a second comparator that compares the first sensing signal and a second reference voltage to output a second error voltage, an OR gate that performs an OR operation on the first error voltage, the off-timing control voltage and the second sensing signal, a flip-flop that includes a reset terminal for receiving an output of the OR gate, a set terminal for receiving the second error voltage and an output terminal for providing an output signal, and a driver that provides the second pulse signal based on the output signal and the second sensing signal.

The flip-flop may reset the output signal in response to a falling edge of the output of the OR gate.

The driver may is configured to provide the second pulse signal having a logic level according to a logic level of the output signal, and the driver is configured to may output the second pulse signal with a low level when the second sensing signal is a high level.

The off-time controller may is configured to provide the PFM unit with the off-timing control voltage which is activated before the zero-current is detected when the peak value of the inductor current is detected in the PFM mode.

The off-time controller may include a scaling current providing unit that provides a scaling current to a connection node in response to a plurality of first switching signals based on a dynamic voltage scaling code when the peak value of the inductor current is detected. The off-time controller may also include a hysteresis comparator, connected to the connection node, which compares a scaling voltage corresponding to the scaling current and a second reference voltage to provide the off-timing control voltage.

The off-timing controller may further include an offset current providing unit that selectively provides an offset current to the connection node in response to a plurality of second switching signals based on a clock signal.

The mode controller may include a second level detector that provides a level detection signal which is activated based on a level of the first sensing signal, a mode signal generator that provides a mode signal which synchronizes with the level detection signal, and a mode trigger that receives the level detection signal and the second sensing signal to generate a mode transition trigger signal. The mode transition trigger signal is activated either when the level of the second sensing signal is lower than a reference value during a reference time, or when a state of the second sensing signal is maintained.

The mode signal generator may is configured to reset the mode signal in response to the activated mode transition trigger signal.

In some embodiments, the driving device unit may include a first driving device that charges the input power supply voltage in the response to the first driving control signal, and a second driving device that discharges the inductor in response to the second driving control signal.

The first and second driving devices may be turned on/off complementarily to each other.

According to some example embodiments, a voltage converter includes a driving device unit, a current sensing unit and a switching control circuit. The driving device unit charges an input power supply voltage in an inductor in response to a first driving control signal, the inductor being connected between a switching node and an output node, and the driving device being configured to discharge the inductor in response to a second driving control signal. The current sensing unit generates first and second sensing signals based on a first sensed current, a second sensed current, a voltage at the switching node and a ground voltage. The first sensed current is based on a current which is responsive to the input power supply voltage. The second sensed current is based on an inductor current flowing through the inductor. The switching control circuit generates the first and second driving control signals by performing a pulse-frequency modulation (PFM) and a pulse-width modulation (PWM) based on a feedback voltage, a reference voltage, the first sensing signal and the second sensing signal. The feedback voltage is based on an output voltage at the output node. The switching control circuit adaptively adjusts off-time when the switching control circuit performs the PFM. The first driving control signal is deactivated during the off-time.

According to some example embodiments, a power management device includes a reference voltage generator, a reset signal generator and a voltage converter. The reference voltage generator generates a reference voltage in response to a power enable signal. The reset signal generator generates a reset signal based on the power enable signal and the reference voltage. The voltage converter generates first and second driving control signals by performing a pulse-frequency modulation (PFM) and a pulse-width modulation (PWM) based on a feedback voltage and the reference voltage, and converts an input power supply voltage to an output voltage in response to the first and second driving control signals. The feedback voltage is obtained by dividing the output voltage at an output node. The voltage converter includes a driving device unit, a current sensing unit and a switching control circuit. The driving device unit charges the input power supply voltage in an inductor connected between a switching node and the output node, in response to the first driving control signal, and discharges the inductor in response to the second driving control signal. The current sensing unit generates first and second sensing signals based on a first sensed current, a second sensed current, a voltage at the switching node and a ground voltage. The first sensed current is based on a current which is responsive to the input power supply voltage. The second sensed current is inversely proportional to an inductor current flowing through the inductor. The first sensing signal indicates a peak value of the inductor current, and the second sensing signal indicates a zero value of the inductor current. The switching control circuit generates the first and second driving control signals by performing the PFM and the PWM based on the feedback voltage, the reference voltage, the first sensing signal and the second sensing signal. The switching control circuit adaptively adjusts off-time when the switching control circuit performs the PFM. The first driving control signal is deactivated during the off-time.

Accordingly, the voltage converter increases the inductor current by turning on the first driving device and turning off the second driving device, using the off-timing control voltage in the switching control circuit before the second sensing signal is activated. Therefore, the voltage converter may increase an efficiency of power transferred to the load in the PFM mode. In addition, the voltage converter stably performs the mode transition based on the first and second sensing signals during a mode transition interval based in the first and second sensing signals.

BRIEF DESCRIPTION OF THE DRAWINGS

Features will become apparent to those of ordinary skill in the art by describing in detail example embodiments with reference to the attached drawings in which.

DETAILED DESCRIPTION OF THE EMBODIMENTS

Figure 1:
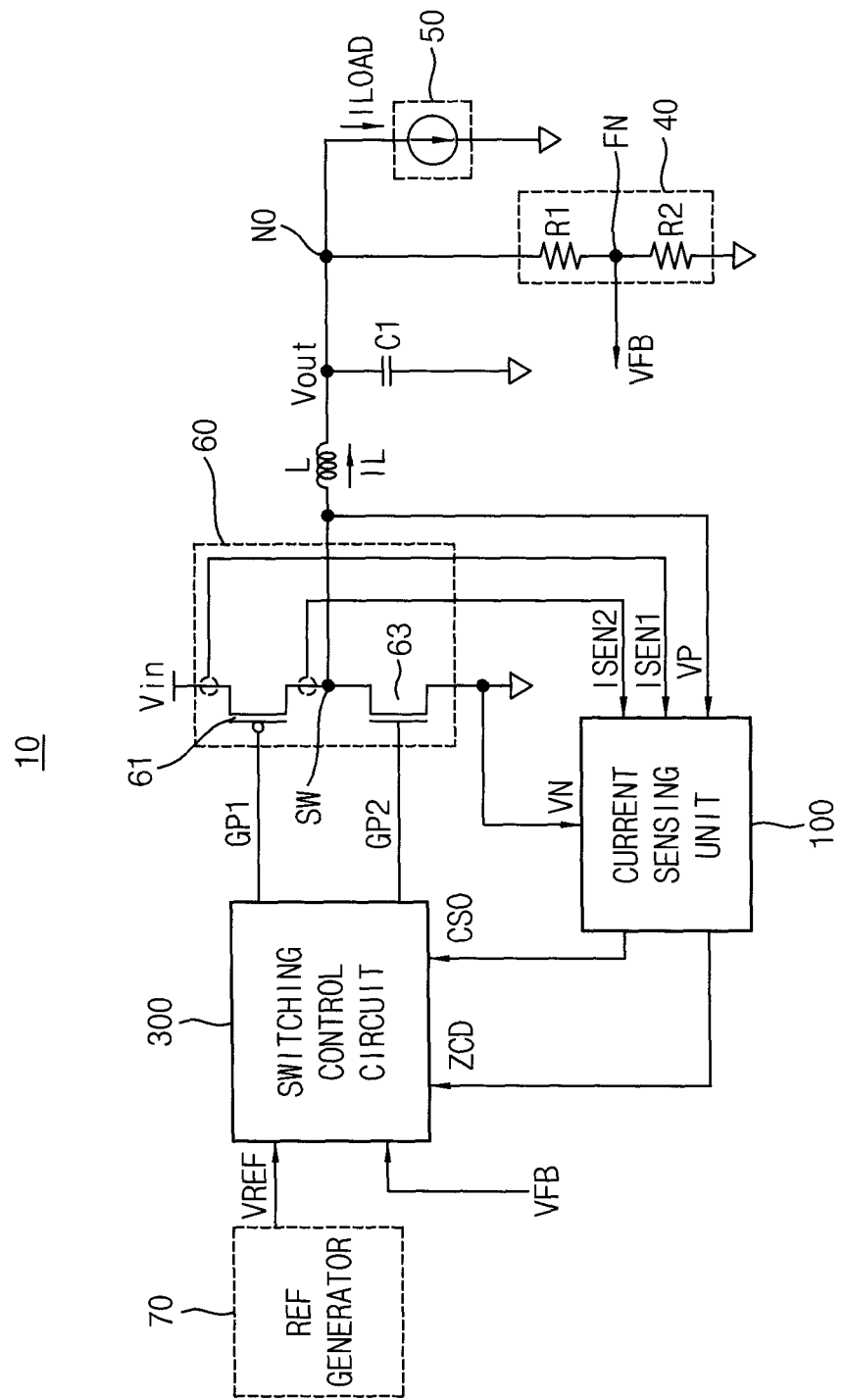
FIG. 1 is a block diagram illustrating a voltage converter according to some example embodiments.

Various example embodiments will be described more fully with reference to the accompanying drawings, in which embodiments are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, according to example embodiments will be described in detail with reference to accompanying drawings. The same reference numerals will be assigned to the same elements, and the details thereof will be omitted in order to avoid redundancy.

FIG. 1 is a block diagram illustrating a voltage converter according to some example embodiments.

Referring to FIG. 1, a voltage converter 10 includes a driving device unit 60, a coil (or an inductor) L, a capacitor C1, a feedback unit 40, a reference voltage generator 70, a current sensing unit 100 and a switching control circuit 300. A load 50 is illustrated for convenience in FIG. 1, and the voltage converter 10 may not include the load 50. The voltage converter 10 may be referred to as a switching mode power supply (SMPS) or a power converter.

The inductor L is connected between a switching node SW and an output node NO, and a smoothing capacitor C1 is connected between the output node NO and a ground. The feedback unit 40 is connected between the output node NO and the ground in parallel with the capacitor C1, includes resistors R1 and R2 connected at a feedback node FN, and divides an output voltage Vout at the output node NO to provide a feedback voltage VFB. A load current ILOAD flows into the load 50 from the output node NO. The inductor L and the capacitor C1 operate as a low-pass filter that removes ripples in the output voltage Vout.

The driving device unit 60 includes a first driving device 61 and a second driving device 63. The first driving device 61 is connected between an input power supply voltage Vin and the switching node SW, and the second driving device 63 is connected between the switching node SW and a ground voltage. The driving device unit 60 charges the input power supply voltage Vin in the inductor L in response to a first driving control signal GP1, and discharges the inductor L in response to a second driving control signal GP2. The first driving device 61 may be a p-channel metal-oxide semiconductor (PMOS) transistor that has a source connected to the input power supply voltage Vin, a drain connected to the switching node SW and a gate receiving the first driving control signal GP1. The first driving device 63 may be a n-channel metal-oxide semiconductor (NMOS) transistor that has a drain connected to the switching node SW, a source connected to the ground voltage and a gate receiving the second driving control signal GP2.

The current sensing unit 100 generates a first sensing signal CSO indicating a peak value of an inductor current IL that flows through the inductor IL, based on a first sensed current ISEN1 and a second sensed current ISEN2. The first sensed current ISEN1 is based on a current flowing through the PMOS transistor 61 in response to the input power supply voltage Vin. The second sensed current ISEN2 is inversely proportional to the inductor current IL and flows through the switching node SW from the drain of the PMOS transistor 61. The current sensing unit 100 further generates a second sensing signal ZCD indicating a zero value of the inductor current IL based on a first voltage signal VP at the switching node SW and a second voltage signal VN at the ground voltage. Here, the first sensed current ISEN1 corresponds to a current flowing into the source of the PMOS transistor 61, and the second sensed current ISEN2 is inversely proportional to the inductor current IL flowing into the inductor L.

The switching control circuit 300 generates the first and second driving control signals GP1 and GP2 by performing a pulse-frequency modulation (PFM) and a pulse-width modulation (PWM) based on the feedback voltage VFB, a reference voltage VREF, the first sensing signal CSO and the second sensing signal ZCD. The switching control circuit 300 may adaptively adjust off-time when the switching control circuit 300 performs the PFM. During the off-time, the first driving control signal is deactivated. The switching control circuit 300 operates in a PFM mode based on first and second sensing signals CSO and ZCD when the peak value of the inductor current IL is less than a reference value. The switching control circuit 300 operates in a PWM mode based on first and second sensing signals CSO and ZCD when the peak value of the inductor current IL is equal to or greater than the reference value. Therefore, the voltage converter 10 may increase an efficiency of power transferred to the load 50.

The reference voltage generator 70 generates the reference voltage VREF and provides the reference voltage VREF to the switching control circuit 300. The reference voltage VREF may include first and second reference voltages VREF1 and VREF2.

Figure 2:
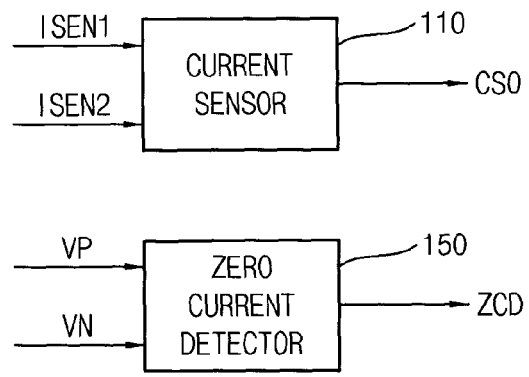
FIG. 2 is a block diagram illustrating an example of a current sensing unit in FIG. 1 according to some embodiments.

FIG. 2 is a block diagram illustrating an example of the current sensing unit in FIG. 1 according to some embodiments.

Referring to FIG. 2, the current sensing unit 100 includes a current sensor 110 and a zero-current detector 150. The current sensor 110 receives the first and second sensed currents ISEN1 and ISEN2 at two terminals of the PMOS transistor 61, and generates the first sensing signal CSO indicating the peak value of the indictor current IL, based on the first and second sensed currents ISEN1 and ISEN2. The zero-current detector 150 generates the second sensing signal ZCD indicating the zero value of the inductor current IL based on the first voltage signal VP at the switching node SW and the second voltage signal VN having a level of the ground voltage.

Figure 3:
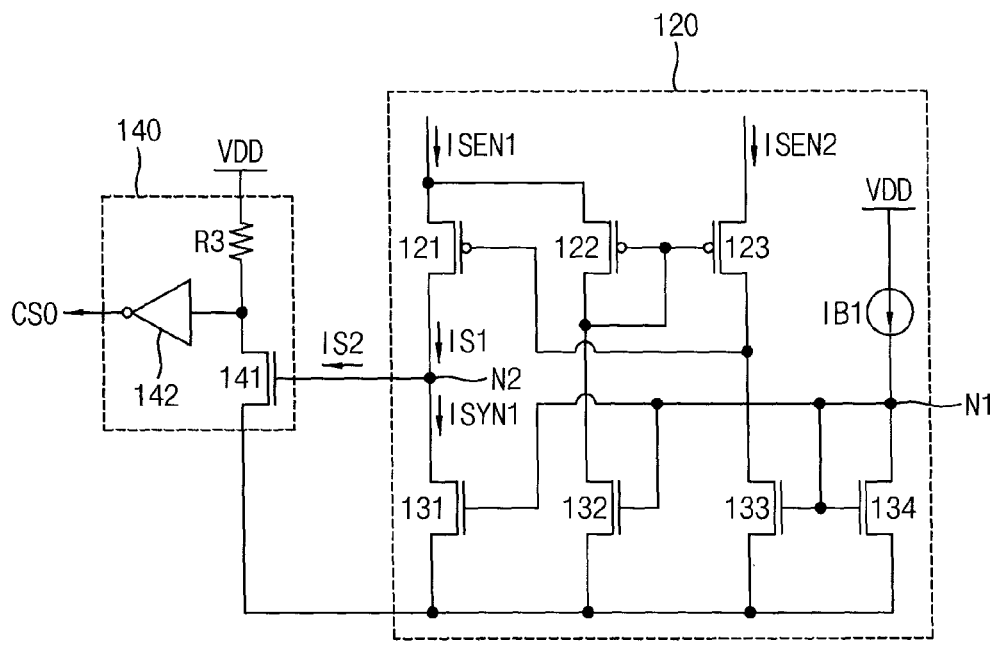
FIG. 3 is a circuit diagram illustrating an example of a current sensor in FIG. 2 according to some embodiments.

FIG. 3 is a circuit diagram illustrating an example of the current sensor in FIG. 2 according to some embodiments.

Referring to FIG. 3, the current sensor 110 includes a peak current sensing unit 120 and a buffer unit 140. The peak current sensing unit 120 receives the first and second sensed currents ISEN1 and ISEN2, and generates a peak current detection signal IS2 based on the first and second sensed currents ISEN1 and ISEN2. The buffer unit 140 receives the peak current detection signal IS2, buffers the peak current detection signal IS2, and provides the first sensing signal CSO.

The peak current sensing unit 120 includes PMOS transistors 121~123, NMOS transistors 131~134 and a current source IB1. The current source IB1 is connected between a power supply voltage VDD and a first node N1. The NMOS transistor 134 has a drain connected to the first node N1 and is diode-connected. The NMOS transistors 133 and 134 are connected in a current mirror configuration. The NMOS transistors 132 and 131 are connected to the NMOS transistor 134 in a current mirror configuration. The first sensed current ISEN1 is applied to sources of the PMOS transistors 121 and 122. The second sensed current ISEN2 is applied to a source of the PMOS transistor 123. Drains of the NMOS transistor 132 and the PMOS transistor 122 are connected to each other, and drains of the NMOS transistor 133 and the PMOS transistor 123 are connected to each other. A gate of the PMOS transistor 121 is coupled to the drain of the PMOS transistor 123, and a drain of the PMOS transistor 121 is connected to a second node N2. A drain of the NMOS transistor 131 is connected to the second node N2.

The buffer unit 140 includes a resistor R3, an inverter 142 and a NMOS transistor 141. The NMOS transistor 141 has a source coupled to the ground voltage and a gate coupled to the second node N2. The resistor R3 is connected between the power supply voltage VDD and a drain of the NMOS transistor 141. The inverter 142 inverts a phase of a voltage signal at the drain of the NMOS transistor 141 to output the first sensing signal CSO.

Hereinafter, there will be description on the current sensor 110 with reference to FIGS. 1 and 3.

Referring to FIGS. 1 and 3, the first sensed current ISEN1 corresponds to a current flowing through the PMOS transistor 61 which performs pull-up operation, and the second sensed current ISEN2 corresponds to a current flowing from the drain of the PMOS transistor 61. Therefore, the second sensed current ISEN2 decreases as the inductor current IL increases.

The first sensed current ISEN1 is applied to sources of the PMOS transistors 121 and 122, and the second sensed current ISEN2 is applied to a source of the PMOS transistor 123. Therefore, current IS1 flowing through the PMOS transistor 121 increases as the inductor current IL increases.

The peak current detection signal IS2 corresponds to a current obtained by subtracting a current ISYN1 flowing through the NMOS transistor 131 from the current IS1. Since the NMOS transistor 131 is connected to the NMOS transistor 134 with a current mirror configuration, the current ISYN1 flowing through the NMOS transistor 131 has a regular level. Therefore, the peak current detection signal IS2 decreases as the inductor current IL increases.

The positive slope of the inductor current IL may be represented as (Vin−Vout)/L, where L denotes inductance of the inductor L. Therefore, when the level of the output voltage Vout increases, the slope of the inductor current IL decreases. When the level of the output voltage Vout decreases, the slope of the inductor current IL increases.

The buffer unit 140 buffers the peak current detection signal IS2 to provide the first sensing signal CSO. Therefore, the level of the first sensing signal CSO increases as the inductor current IL increases, and the level of the first sensing signal CSO decreases as the inductor current IL decreases. That is, the level of the first sensing signal CSO is proportional to the inductor current IL.

When the level of the output voltage Vout is high, the peak value of the inductor current IL decreases, which enables the first sensing signal CSO. When the level of the output voltage Vout is low, the peak value of the inductor current IL increases, which enables the first sensing signal CSO. When the first sensing signal CSO is activated, the PMOS transistor 61 is turned-off and the inductor current IL has a negative slope.

Figure 4:
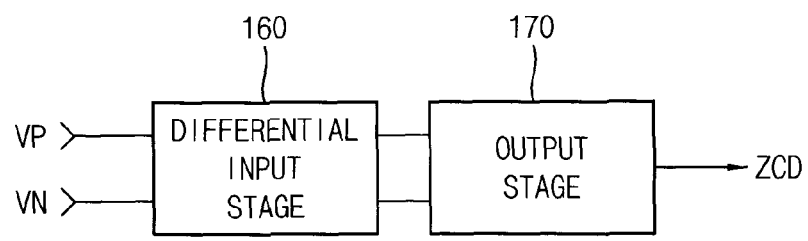
FIG. 4 is a block diagram illustrating an example of a zero-current detector in FIG. 2 according to some embodiments.

FIG. 4 is a block diagram illustrating an example of the zero-current detector in FIG. 2 according to some embodiments.

Referring to FIG. 4, the zero-current detector 150 includes a differential input stage 160 and an output stage 170.

The differential stage 160 receives the first and second voltage signals VP and VN, and the output stage 170 is coupled to the differential stage 160 and amplifies difference of the first and second voltage signals VP and VN to provide the second sensing signal ZCD.

Figure 5:
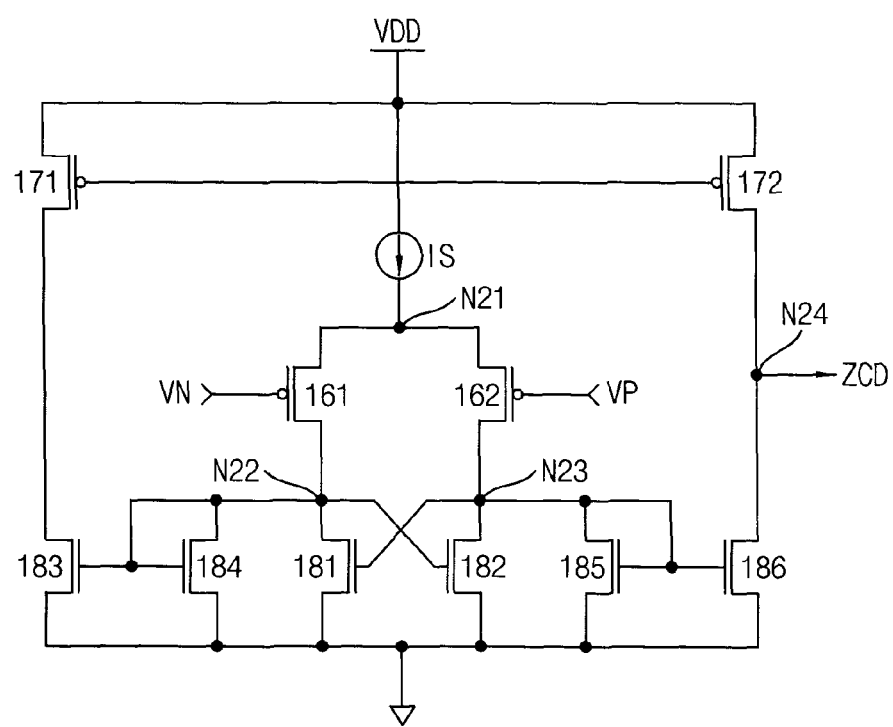
FIG. 5 is a circuit diagram illustrating the zero-current detector of FIG. 4 according to some embodiments.

FIG. 5 is a circuit diagram illustrating the zero-current detector of FIG. 4 according to some embodiments.

Referring to FIGS. 4 and 5, the zero-current detector 150 includes a current source IS, PMOS transistors 161, 162, 171 and 172, and NMOS transistors 181~186. The current source IS, the PMOS transistors 161 and 162 and the NMOS transistors 181 and 182 correspond to the differential input stage 160 in FIG. 4. The PMOS transistors 171 and 172, and the NMOS transistors 183~186 correspond to the output stage 170 in FIG. 4.

The current source IS may be electrically coupled between the power supply voltage VDD and a first node N21. The PMOS transistor 161 is electrically coupled between the first node N21 and a second node N22, and has a gate to which the second voltage signal VN is applied. The PMOS transistor 162 is electrically coupled between the first node N21 and a third node N23, and has a gate to which the first voltage signal VP is applied. The NMOS transistor 181 is electrically coupled between the second node N22 and the ground voltage, and the NMOS transistor 182 is electrically coupled between the third node N23 and the ground voltage. A drain of the NMOS transistor 181 is electrically connected to a gate of the NMOS transistor 182, and a gate of the NMOS transistor 181 is electrically connected to a drain of the NMOS transistor 182. The NMOS transistor 184 has a diode form, and is electrically coupled between the second node N22 and the ground voltage. The NMOS transistor 185 has a diode form, and is electrically coupled between the third node N23 and the ground voltage. The NMOS transistor 183 has a gate connected to a gate of the NMOS transistor 184 and a source connected to the ground voltage. The NMOS transistor 186 has a gate connected to a gate of the NMOS transistor 185, a drain connected to a fourth node N24 and a source connected to the ground voltage. The PMOS transistor 171 has a diode form. The PMOS transistor 171 has a source connected to the power supply voltage VDD, and a drain connected to a drain of the NMOS transistor 183. The PMOS transistor 172 has a gate connected to a gate of the PMOS transistor MP3, a source connected to the power supply voltage VDD, and a drain connected to the fourth node N24. The second sensing signal ZCD is provided at the fourth node N21 of the zero-current detector 150.

Hereinafter, an operation of the zero-current detector 150 will be described with reference to FIGS. 1 and 5.

When the first and second driving control signals GP1 and GP2 are at a logic low level, the first driving device 61 is turned-on and the second driving device 63 is turned-off. When the first driving device 61 is turned-on, the input power supply voltage Vin is applied to the switching node SW, and the inductor current IL flows through the inductor L, the capacitor C1 and a parasitic diode of the second driving device 63. When the first and second driving control signals GP1 and GP2 transit to a logic high level, the first driving device 61 is turned-off and the second driving device 63 is turned-on. When the second driving device 63 is turned-on, the inductor current IL flows through the inductor L, the capacitor C1 and the second driving device 63, and the level of the inductor current IL gradually decreases. The second sensing signal ZCD is generated when a voltage between the switching node SW and the ground voltage, that is, a voltage between two terminals of the second driving device 63 changes from a negative value to a positive value.

The voltage converter 10 increases the inductor current IL by turning-on the first driving device 61 and turning-off the second driving device 63 using an off-timing control voltage VOFT in the switching control circuit 300. Therefore, the voltage converter 10 may increase an efficiency of power transferred to the load 50 in a PFM mode.

Figure 6:
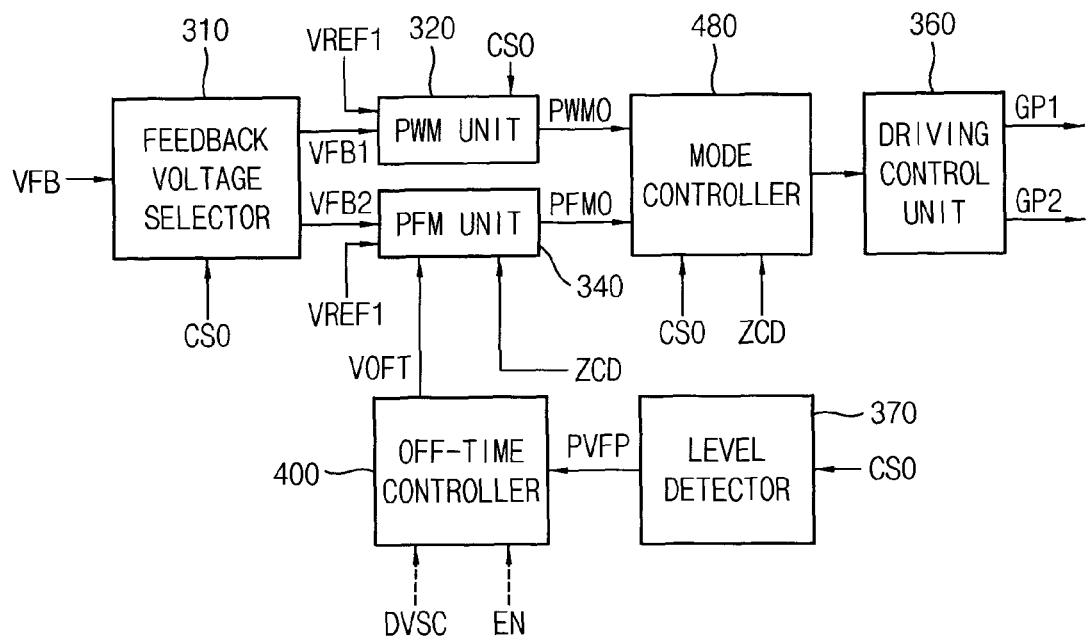
FIG. 6 is a block diagram illustrating a switching control circuit in FIG. 1 according to some embodiments.

FIG. 6 is a block diagram illustrating the switching control circuit in FIG. 1 according to some embodiments.

Referring to FIG. 6, the switching control circuit 300 includes a feedback voltage selector 310, a PWM unit 320, a PFM unit 340, a mode controller 480, a driving control unit 360, a level detector 370 and an off-time controller 400.

The feedback voltage selector 310 receives the first sensing signal CSO to select a providing path of the feedback voltage VFB according to a peak value of the first sensing signal CSO. When the level of the first sensing signal CSO is lower than a reference value, the feedback voltage selector 310 provides the feedback voltage VFB as a second feedback voltage VFB2 to the PFM unit 340. When the level of the first sensing signal CSO is equal to or greater than the reference value, the feedback voltage selector 310 provides the feedback voltage VFB as a first feedback voltage VFB1 to the PWM unit 320.

The PWM unit 320 receives a first reference voltage VREF1, the feedback voltage VFB1 and the first sensing signal CSO, and performs a PWM according to a difference between the first reference voltage VREF1 and the feedback voltage VFB1 to generate a first pulse signal PWMO. The PFM unit 340 receives the first reference voltage VREF1 and the feedback voltage VFB2, and performs a PFM according to a difference between the first reference voltage VREF1 and the feedback voltage VFB2 to generate a second pulse signal PFMO. The PFM unit 340 adjust a frequency of the second pulse signal PFMO in response to the off-timing control voltage VOFT.

The mode controller 480 selects one of the first and second pulse signals PWMO and PFMO according to an operation mode based on the first and second sensing signals CSO and NCD to provide the selected one to the driving control unit 360. The driving control unit 360 determines on and off timings of the first and second driving control signals GP1 and GP2 based on a selected pulse signal of the mode controller 480.

The level detector 370 receives the first sensing signal CSO and generates a peak pulse signal PVFP to the off-time controller 400, which is activated when the peak value of the first sensing signal CSO is detected.

The off-time controller 400 generates the off-timing control voltage VOFT that adjusts the frequency of the second pulse signal PFMO, based on the peak pulse signal PVFP, and provides the off-timing control voltage VOFT to the PFM unit 340. The off-time controller 400 may generate the off-timing control voltage VOFT further based on a dynamic scaling code DVSC and an enable signal EN which are externally provided.

Figure 7:
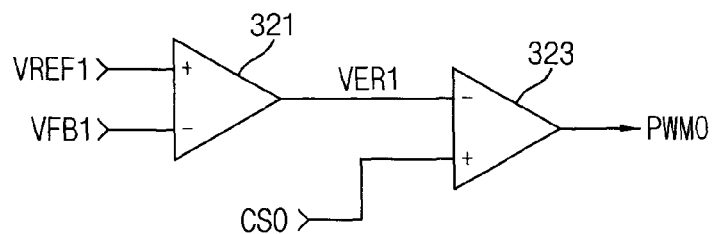
FIG. 7 is a circuit diagram illustrating a pulse-width modulation (PWM) unit in FIG. 6 according to some embodiments.

FIG. 7 is a circuit diagram illustrating the PWM unit in FIG. 6 according to some embodiments.

Referring to FIG. 7, the PWM unit 320 includes a comparator 321 and a PWM comparator 323.

The comparator 321 compares the first reference voltage VREF1 and the feedback voltage VFB1 to output an error voltage VER1 according to a difference between the first reference voltage VREF1 and the feedback voltage VFB1. The comparator 321 may output the error voltage VER1 with a high level when the first reference voltage VREF1 is equal to or greater than the feedback voltage VFB1. The PWM comparator 323 compares the error voltage VER1 and the first sensing signal CSO to output the first pulse signal PWMO according to a difference between the error voltage VER1 and the first sensing signal CSO.

Figure 8:
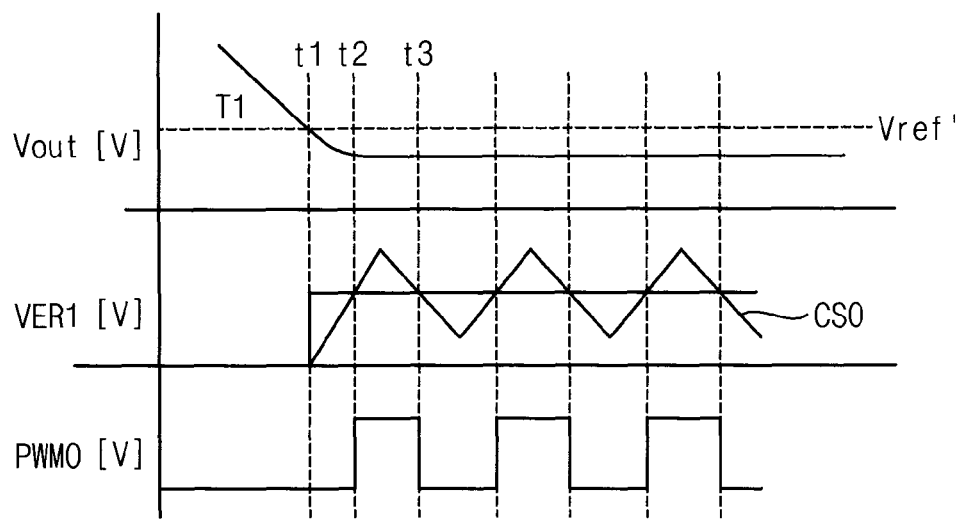
FIG. 8 is a timing diagram illustrating various signals in the PWM unit of FIG. 7.

FIG. 8 is a timing diagram illustrating various signals in the PWM unit of FIG. 7.

In FIG. 8, Vref represents an electric potential of the output voltage Vout in a case where the feedback voltage VFB1 is the same as the reference voltage Vref.

While the output voltage Vout is lower than the Vref which corresponds to the reference voltage Vref, namely, during period T1, the error voltage VER1, the output of the comparator 321 is at a low level. During the period T1, the first pulse signal PWMO is at a low level and the driving control unit 360 outputs the first and second driving control signals GP1 and GP2 which turn on the first driving device 61 and turn off the second driving device 63, respectively.

As a result, the output voltage Vout gradually decreases, and the feedback node FN decreases accordingly during the period T1. When the output voltage Vout becomes equal to or lower than Vref, the error voltage VER1 changes from the low level to a high level. Since the level of the first sensing signal CSO is lower than a level of the error voltage VER1 between timings t1 and t2, the PWM comparator 323 outputs the first pulse signal PWMO with a low level. Since the level of the first sensing signal CSO is higher than the level of the error voltage VER1 between timings t2 and t3, the PWM comparator 323 outputs the first pulse signal PWMO with a high level. Then, the driving control unit 360 outputs the first and second driving control signals GP1 and GP2 which turn off the first driving device 61 and turn on the second driving device 63, respectively.

Figure 9:
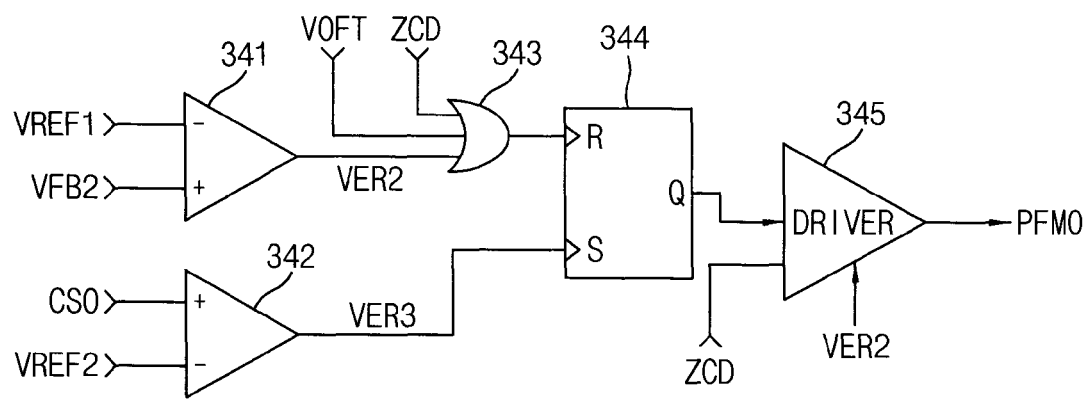
FIG. 9 is a circuit diagram illustrating a pulse-frequency modulation (PFM) unit in FIG. 6 according to example embodiments.

FIG. 9 is a circuit diagram illustrating the PFM unit in FIG. 6 according to example embodiments.

Referring to FIG. 9, the PFM unit 340 includes a first comparator 341, a second comparator 342, an OR gate 343, a flip-flop 344 and a driver 345.

The first comparator 341 compares the feedback voltage VFB2 and the first reference voltage VREF1 to output an error voltage VER2 according to a difference between the feedback voltage VFB2 and the first reference voltage VREF1. The second comparator 342 compares the first sensing signal CSO and a second reference voltage VREF2 to output an error voltage VER3 according to a difference between the first sensing signal CSO and the second reference voltage VREF2. The OR gate 343 performs an OR operation on the error voltage VER2, the second sensing signal ZCD and the off-timing control voltage VOFT. The flip-flop 344 may be an RS flip-flop which has a set terminal receiving the error voltage, a reset terminal receiving an output of the OR gate 343 and an output terminal providing an output signal.

The driver 345 is controlled by the error voltage VER2, and outputs the second pulse signal PFMO based on the output of the flip-flop 344 and the second sensing signal ZCD. When the level of the feedback voltage VFB2 is lower than the first reference voltage VREF1 and the error voltage VER2 is low level, the driver 345 outputs the second pulse signal PFMO based on the output of the flip-flop 344. When the level of the feedback voltage VFB2 is greater than the first reference voltage VREF1 and the error voltage VER2 is at a high level, the driver 345 outputs the second pulse signal PFMO based on the second sensing signal ZCD.

While the first driving control signal GP1 is at a low level, the first driving device 61 is turned-on and the inductor current IL increases. When the inductor current IL arrives at the peak level, the error voltage VER3 transits to a high level, the flip-flop 344 is set and the driver 345 outputs the second pulse signal PFMO with a high level. Therefore, the first driving control signal GP1 transits to a high level to turn-off the first driving device 61, and thus, the level of the first sensing signal CSO decreases. While the level of the first sensing signal CSO decreases, the output of the flip-flop 344 is reset in response to the off-timing control voltage VOFT transiting to a low level, and the driver 345 outputs the second pulse signal PFMO with a low level. Therefore, the first driving control signal GP1 transits to a low level to turn-on the first driving device 61, and thus, the level of the first sensing signal CSO increases again.

Figure 10:
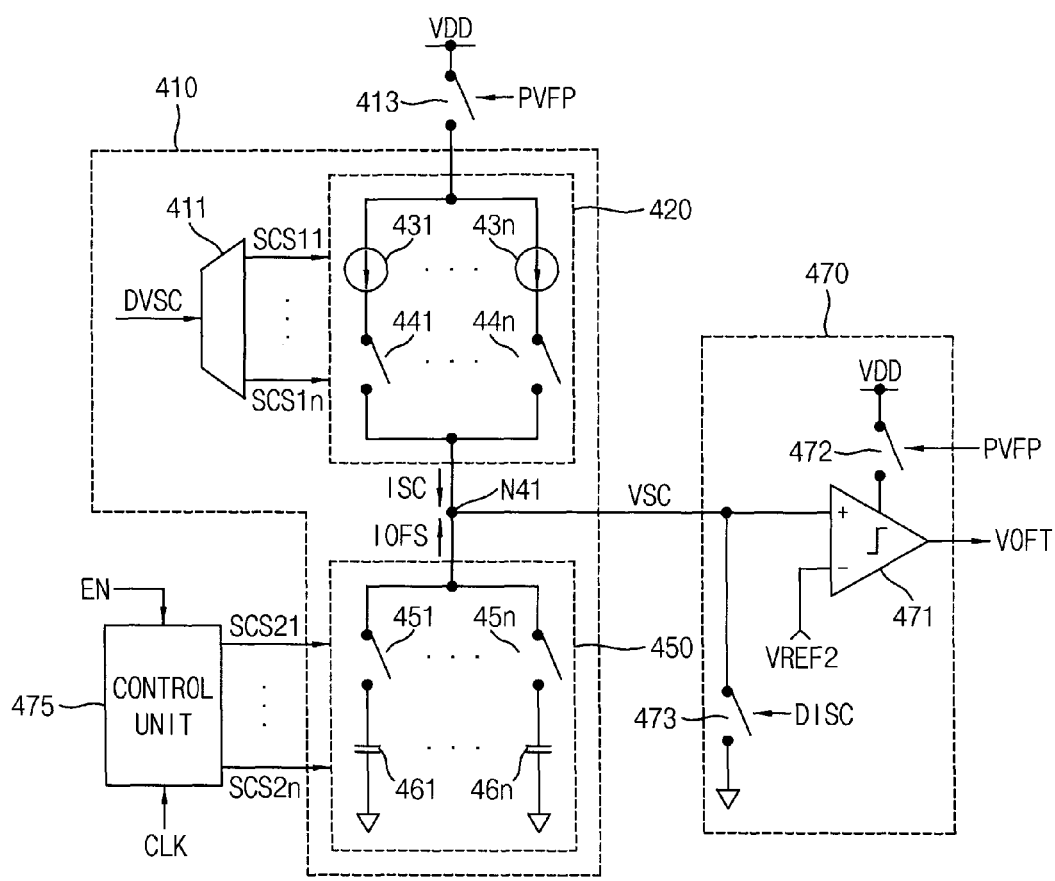
FIG. 10 is a circuit diagram illustrating an off-time controller in FIG. 6 according to some embodiments.

FIG. 10 is a circuit diagram illustrating the off-time controller in FIG. 6 according to some embodiments.

Referring to FIG. 10, the off-time controller 400 includes an adaptive control unit 410, a control voltage generation unit 470 and an offset control unit 475. The adaptive control unit 410 includes a demultiplexer 411, a switch 413, a scaling current providing unit 420 and an offset current providing unit 450. The control voltage generation unit 470 includes a switch 472, a hysteresis comparator 471 and a switch 473. The scaling current providing unit 420 and the offset current providing unit 450 are connected at a connection node N41.

The demultiplexer 411 decodes the dynamic voltage scaling code DVSC to generate a plurality of first switching signals SCS11~SCS1$n$. The switch 413 provides the power supply voltage VDD to the scaling current providing unit 420 in response to the peak pulse signal PVFP. The scaling current providing unit 420 includes a plurality of current sources 431~43$n$ and a plurality of first switches 441~44$n$, each connected to corresponding one of the current sources 431~43$n$ in series. The switches 441~44$n$ are selectively connected in response to the first switching signals SCS11~SCS1$n$ and provide the connection node N41 with a scaling current ISC corresponding to the dynamic voltage scaling code DVSC.

The offset control unit 475 is enabled in response to the enable signal EN and provides a plurality of second switching signals SCS21~SCS2$n$ based on a clock signal CLK. The offset current providing unit 450 includes a plurality of second switches 451~45$n$ and a plurality of capacitors 461~46$n$, each connected to corresponding one of the second switches 451~45$n$ in series between the connection node N41 and the ground voltage. The second switches 451~45$n$ are selectively connected in response to the second switching signals SCS21~SCS2$n$ and provide the connection node N41 with an offset current IOFS corresponding to voltages charged in the capacitors 461~46$n$.

The switch 472 in the control voltage generation unit 470 provides the power supply voltage VDD to the hysteresis comparator 471 in response to the peak pulse signal PVFP, and the switch 473 discharges the connection node N41 to the ground voltage in response to a discharge signal DISC. The hysteresis comparator 471 compares a scaling voltage VSC at the connection node N41 and the second reference voltage VREF2 to output the off-timing control voltage VOFT according to the comparison result. For example, while the scaling voltage VSC at the connection node N41 linearly increases from the ground voltage to the level of the second reference voltage VREF2, the off-timing control voltage VOFT is at a high level. While the scaling voltage VSC at the connection node N41 linearly decreases from the level of the second reference voltage VREF2 to the ground voltage, the off-timing control voltage VOFT is at a low level. Therefore, the off-timing control voltage VOFT may be a pulse-type signal. When the offset current IOFS is provided to the connection node N41, the level of the scaling voltage VSC increases and the frequency of the off-timing control voltage VOFT may be adjusted by the offset current IOFS.

Figure 11:
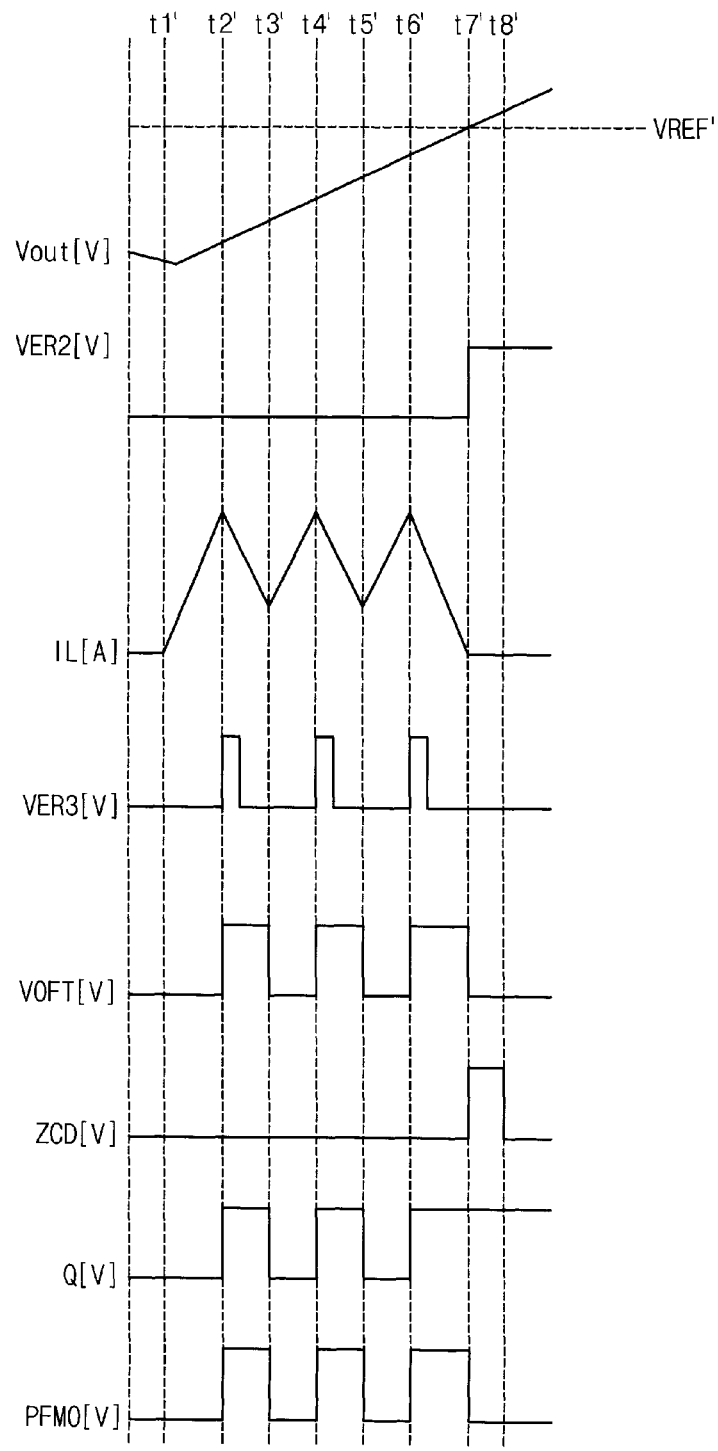
FIG. 11 is a timing diagram illustrating various signals in the PFM unit of FIG. 9.

FIG. 11 is a timing diagram illustrating various signals in the PFM unit of FIG. 9.

In FIG. 11, VREF" represents an electric potential of the output voltage Vout in a case where the feedback voltage VFB2 is the same as the reference voltage Vref.

It is assumed that the first and second driving devices 61 and 63 are turned-off before timing t1'. Since the level of the output voltage Vout is lower than the reference voltage VREF', the error voltage VER2 is at a low level at timing t1'. Therefore, the second pulse signal PFMO is at a low level, and the driving control unit 360 outputs the first and second driving control signals GP1 and GP2 which turn on the first driving device 61 and turn off the second driving device 63, respectively. Accordingly, the inductor current IL and the first sensing signal CSO linearly increase between timings ti1 and t2, and the inductor current IL reaches the peak value at timing t2'.

The error voltage VER3 transits to a high level at timing t2'. The error voltage VER3 with a high level sets the flip-flop 344 and thus the output signal Q transits to a high level. Therefore, at timing t2', the second pulse signal PFMO transits to a high level, and the driving control unit 360 outputs the first and second driving control signals GP1 and GP2 which turn off the first driving device 61 and turn on the second driving device 63, respectively. Therefore, the inductor current IL linearly decreases from the peak value. The off-timing of the first driving device 61 may be adjusted by the off-timing control voltage VOFT. The PFM unit 340 resets the flip-flop 344 in response to a falling edge of the off-timing control voltage to transit the second pulse signal PFMO at timing t3' before the inductor current IL reaches its zero value. Therefore, the driving control unit 360 outputs the first and second driving control signals GP1 and GP2 which turn on the first driving device 61 and turn off the second driving device 63, respectively. Accordingly, the inductor current IL increases its peak value between timings t3'~t4'. These operations are repeated between timings t4'~t6'. At timing t7', the level of the output voltage Vout is substantially the same as the level of the reference voltage VREF', and the driver 345 in FIG. 5 operates based on the second sensing signal ZCD. Therefore, the inductor current IL reaches its zero value at timing T7'. The second pulse signal PFMO transits to a low level based on the second sensing signal ZCD which is activated between timings t7'~t8', and the second pulse signal PFMO turns-off the second driving device 63.

Figure 12:
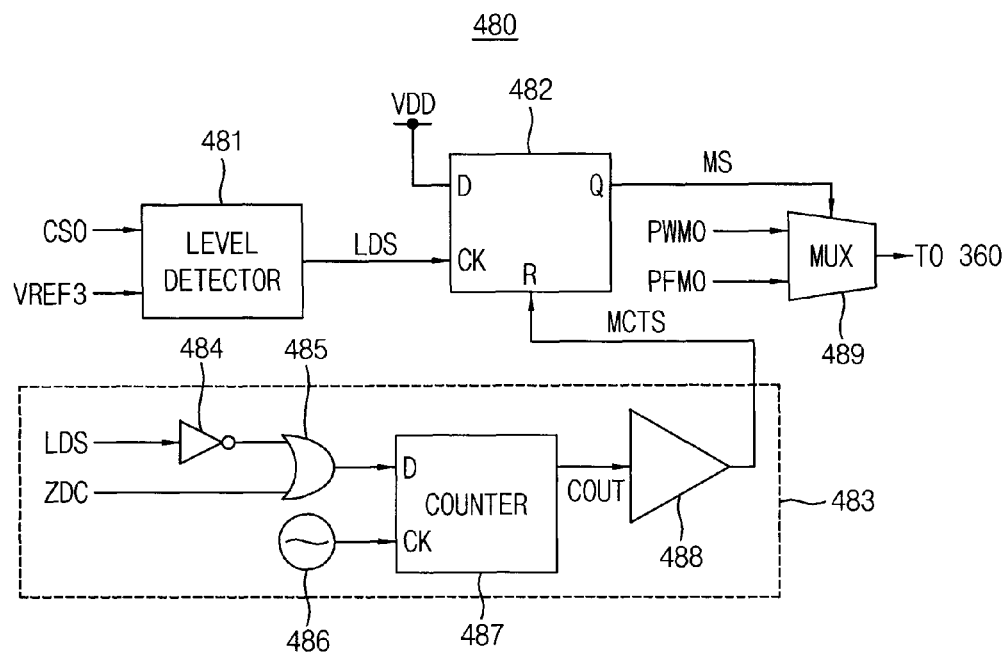
FIG. 12 is a circuit diagram illustrating a mode controller 480 in FIG. 6 according to example embodiments.

FIG. 12 is a circuit diagram illustrating the mode controller 480 in FIG. 6 according to example embodiments.

Referring to FIG. 12, the mode controller 480 includes a level detector 481, a mode signal generator 482, a mode trigger 483 and a multiplexer 489. The mode trigger 483 includes an inverter 484, an OR gate 485, an oscillator 486, a counter 487 and a buffer 488.

The level detector 481 compares the level of the first sensing signal CSO which is proportional to the inductor current IL with a third reference voltage VREF3 to output a level detection signal LDS that are activated when the level of the first sensing signal CSO is equal to or greater than the third reference voltage VREF3. The level detection signal LDS may be a signal that triggers the PWM mode of the voltage converter 10. The mode signal generator 482 may be a D flip-flop which has a data terminal D coupled to the power supply voltage VDD, a clock terminal CK receiving the level detection signal LDS, an output terminal Q providing the mode signal MS and a reset terminal receiving a mode transition trigger signal MCTS. That is, the mode signal generator 482 may output the mode signal MS with a high level when the level of the first sensing signal CSO is equal to or greater than the third reference voltage VREF3.

The inverter 484 inverts the level detection signal LDS, and the OR gate performs an OR operation on an output of the inverter 484 and the second sensing signal ZCD. The OR gate 485 provides its output to the data terminal of the counter 487. The oscillator 486 provides a clock signal to the clock terminal CK of the counter 487. Therefore, the counter 487 outputs a counter output signal COUT when the output of the OR gate 485 is maintained during a reference time. The buffer 488 buffers the counter output signal COUT to provide the mode transition signal MCTS to the reset terminal R of the D flip-flop 482, which resets the D flip-flop 482. Therefore, when the level of the first sensing signal CSO is lower than the third reference voltage during the reference time or when the second sensing signal ZCD is maintained during the reference time, the mode transition signal MCTS is activated to reset the D flip-flop 482. When the D flip-flop 482 is reset, the mode signal MS transits to a low level to trigger the PFM mode of the voltage converter 10.

The multiplexer 489 selects one of the first and second pulse signals PWMO and the PFMO in response to the mode signal MS to provide the selected one to the driving control unit 360.

Figure 13:
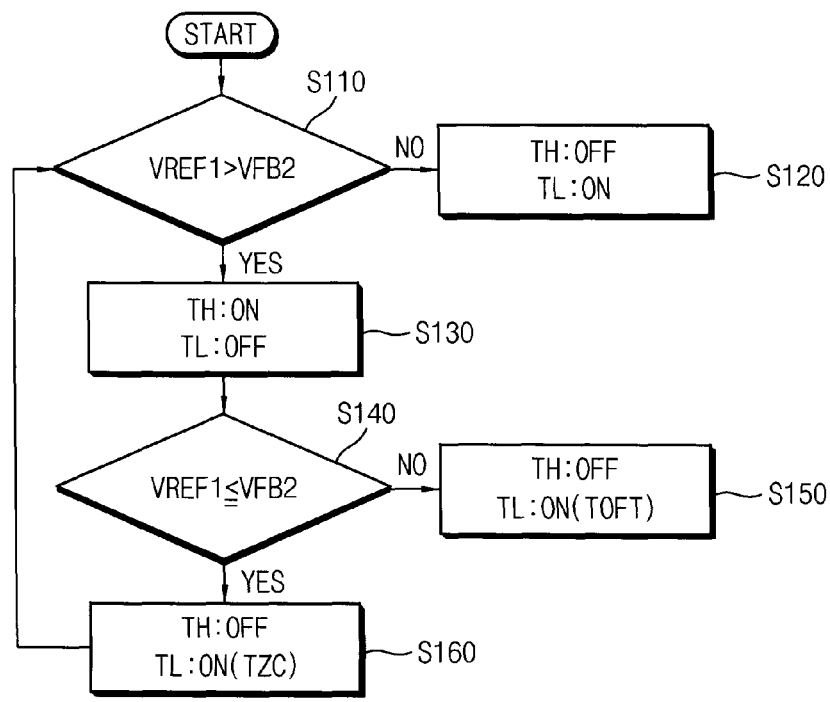
FIG. 13 is a state diagram illustrating operations of the PFM unit of FIG. 9 and the off-time controller of FIG. 11 according to some embodiments.

FIG. 13 is a state diagram illustrating operations of the PFM unit of FIG. 9 and the off-time controller of FIG. 11 according to some embodiments.

Referring to FIG. 1, FIGS. 9 through 13, the PFM unit 340 determines whether the first reference voltage VREF1 is greater than the feedback voltage VFB2 (S110). The load current ILOAD is inversely proportional to the level of the output voltage Vout, and the inductor current IL is inversely proportional to the level of the output voltage Vout. When the first reference voltage VREF1 is not greater than the feedback voltage VFB2 (NO in S110), the first driving device (TH) 61 is turned off and the second driving device (TL) 63 is turned on (S120). Therefore, the inductor current IL decreases and the level of the output voltage Vout increases. When the first reference voltage VREF1 is greater than the feedback voltage VFB2 (YES in S110), the first driving device (TH) 61 is turned on and the second driving device (TL) 63 is turned off (S130). Therefore, the inductor current IL increases and the level of the output voltage Vout decreases. The PFM unit 340 determines whether the first reference voltage VREF1 is not greater than the feedback voltage VFB2 (S140). When the first reference voltage VREF1 is greater than the feedback voltage VFB2 (NO in S140), the first driving device (TH) 61 is turned off and the second driving device (TL) 63 is turned on during a first regular time TOFT for decreasing the inductor current IL (S150). The first regular time may correspond to an activation interval of the off-timing control voltage VOFT. When the first reference voltage VREF1 is not greater than the feedback voltage VFB2 (YES in S140), the first driving device (TH) 61 is turned off and the second driving device (TL) 63 is turned on during a second regular time TZC. The second regular time may correspond to a time during which the inductor current IL decreases from the peak value to the zero value.

Figure 14:
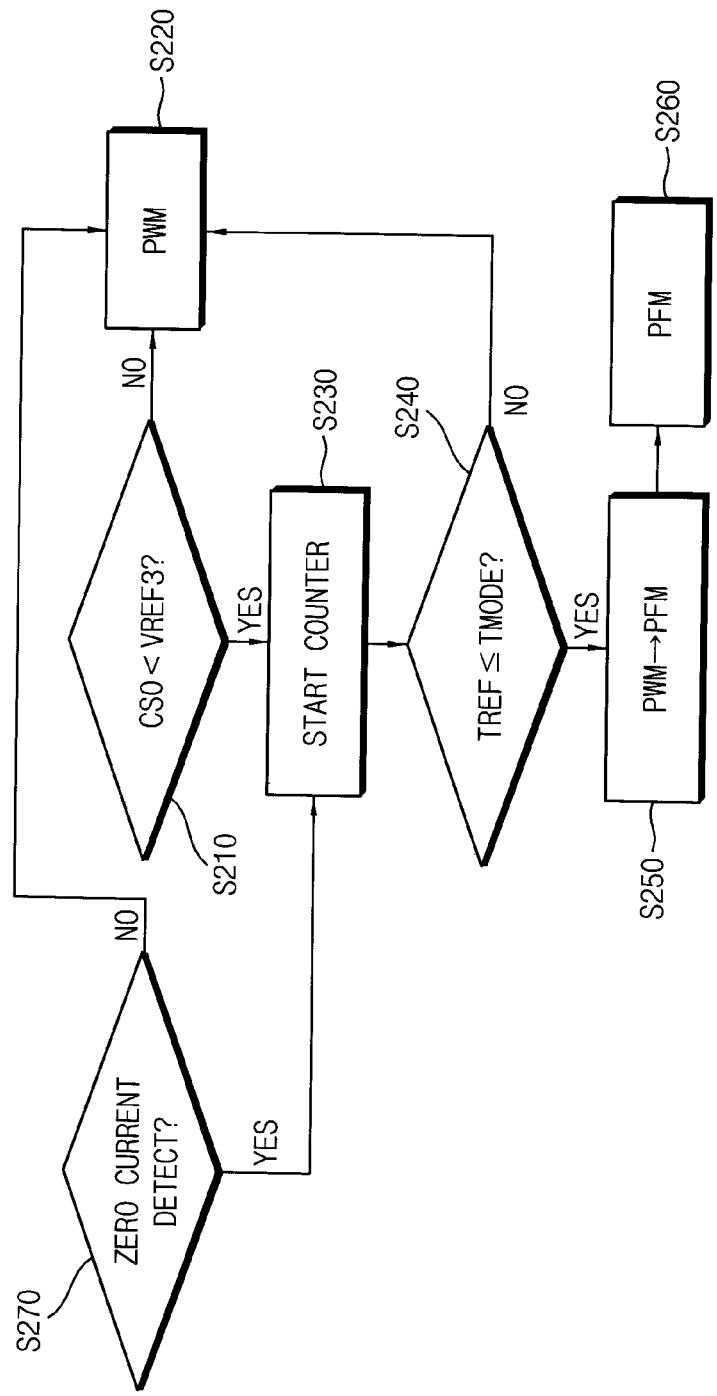
FIG. 14 is a state diagram illustrating operation of the mode controller of FIG. 12 according to some embodiments.

FIG. 14 is a state diagram illustrating an operation of the mode controller of FIG. 12 according to some embodiments.

Referring to FIGS. 12 and 14, the level detector 180 determines whether the level of the first sensing signal CSO which is proportional to the inductor current IL is lower than the third reference voltage VREF3 (S210). When the level of the first sensing signal CSO is not lower than the third reference voltage VREF3 (NO in S210), the mode controller 480 activates the mode signal MS such that the voltage converter 10 operates in a PWM mode because the level of the inductor current IL and the level of the load current are not lower than the reference value (S220). When the level of the first sensing signal CSO is lower than the third reference voltage VREF3 (YES in S210), the counter 487 starts (S230). It is determined whether a state during which the level of the first sensing signal CSO is lower than the third reference voltage VREF3 (TMODE) is maintained during a reference time TREF (S240). When the state (TMODE) is maintained during the reference time TREF (YES in S240), an operation mode of the voltage converter 10 transits from the PWM mode to the PFM mode (S250), and the voltage converter 10 operates in the PFM mode (S260). When the state (TMODE) is not maintained during the reference time TREF (NO in S240), the voltage converter 10 still operates in the PWM mode (S220).

In addition, the mode trigger 486 determines whether the zero value of the inductor current IL is detected (S270). When the zero value of the inductor current IL is not detected (NO in S270), the voltage converter 10 operates in the PWM mode (S220). When the zero value of the inductor current IL is detected (YES in S270),). It is determined whether a state during which the zero value of the inductor current IL is detected (TMODE) is maintained during the reference time TREF (S240). When the state (TMODE) is maintained during the reference time TREF (YES in S240), an operation mode of the voltage converter 10 transits from the PWM mode to the PFM mode (S250), and the voltage converter 10 operates in the PFM mode (S260). When the state (TMODE) is not maintained during the reference time TREF (NO in S240), the voltage converter 10 still operates in the PWM mode (S220).

Figure 15:
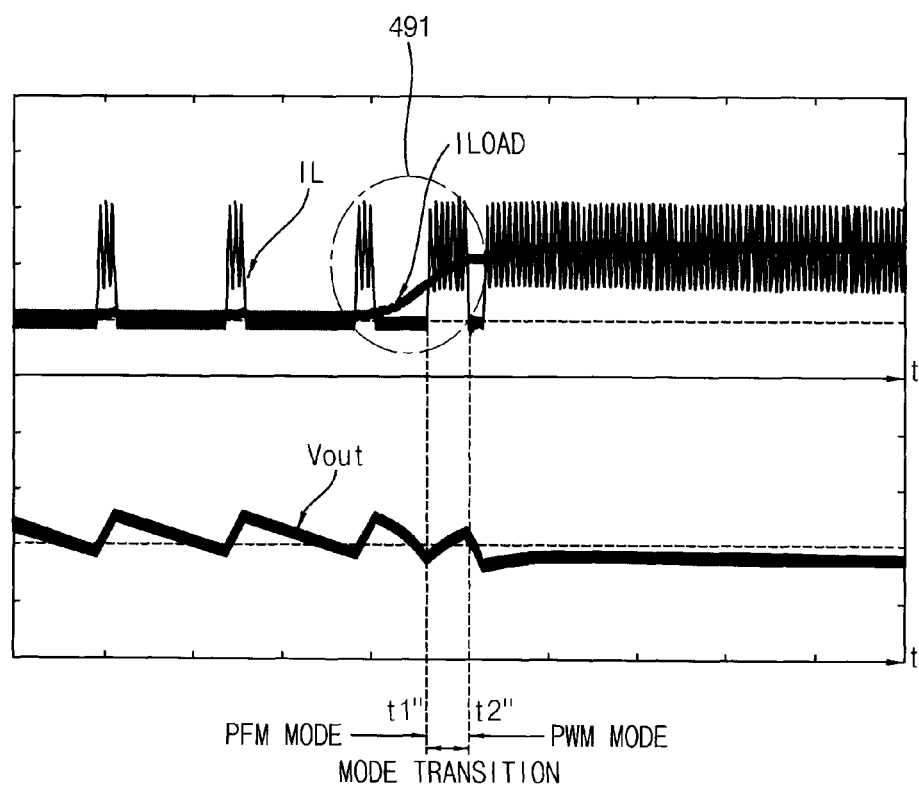
FIG. 15 is a graph for explaining operation of the voltage converter of FIG. 1.
Figure 16:
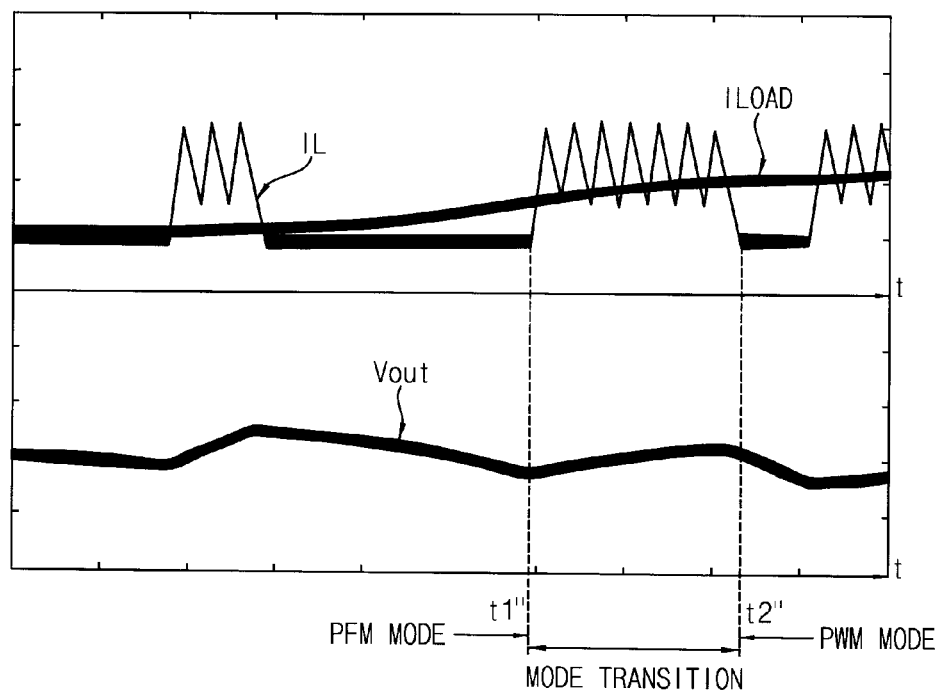
FIG. 16 is a graph which enlarges a portion of FIG. 15.

FIG. 15 is a graph explaining an operation of the voltage converter of FIG. 1 and FIG. 16 is a graph which enlarges a portion of FIG. 15.

Referring to FIGS. 15 and 16, since the level of the load current ILOAD is lower than the reference level at an initial stage of an operation of the voltage converter 10, that is, the level of the output voltage Vout is greater than the reference level, the voltage converter 10 operates in the PFM mode. In the PFM mode before timing t1", the voltage converter 10 increases the inductor current IL by turning-on the first driving device 61 and turning-off the second driving device 63 using an off-timing control voltage VOFT in the switching control circuit 300 before the second sensing signal ZCD is activated. Therefore, the voltage converter 10 may increase an efficiency of power transferred to the load 50 in the PFM mode.

When the load current ILOAD begins to increase and the level of the load current ILOAD approaches at the reference level between timings t1"~t2", the voltage converter 10 increases the frequency of the off-timing control voltage VOFT, and the operation mode of the voltage converter 10 transits from the PFM mode to the PWM mode.

The level of the load current ILOAD is greater than the reference level between timings t1"~t2" and the voltage converter 10 operates in the PWM mode after timing t2". It is noted that the power is transferred to the load 50 with a higher efficiency than a case when the inductor current IL reaches its zero value because an average value of the inductor current IL is transferred to the load 50 in a mode transition interval 491 in FIG. 16.

Figure 17:
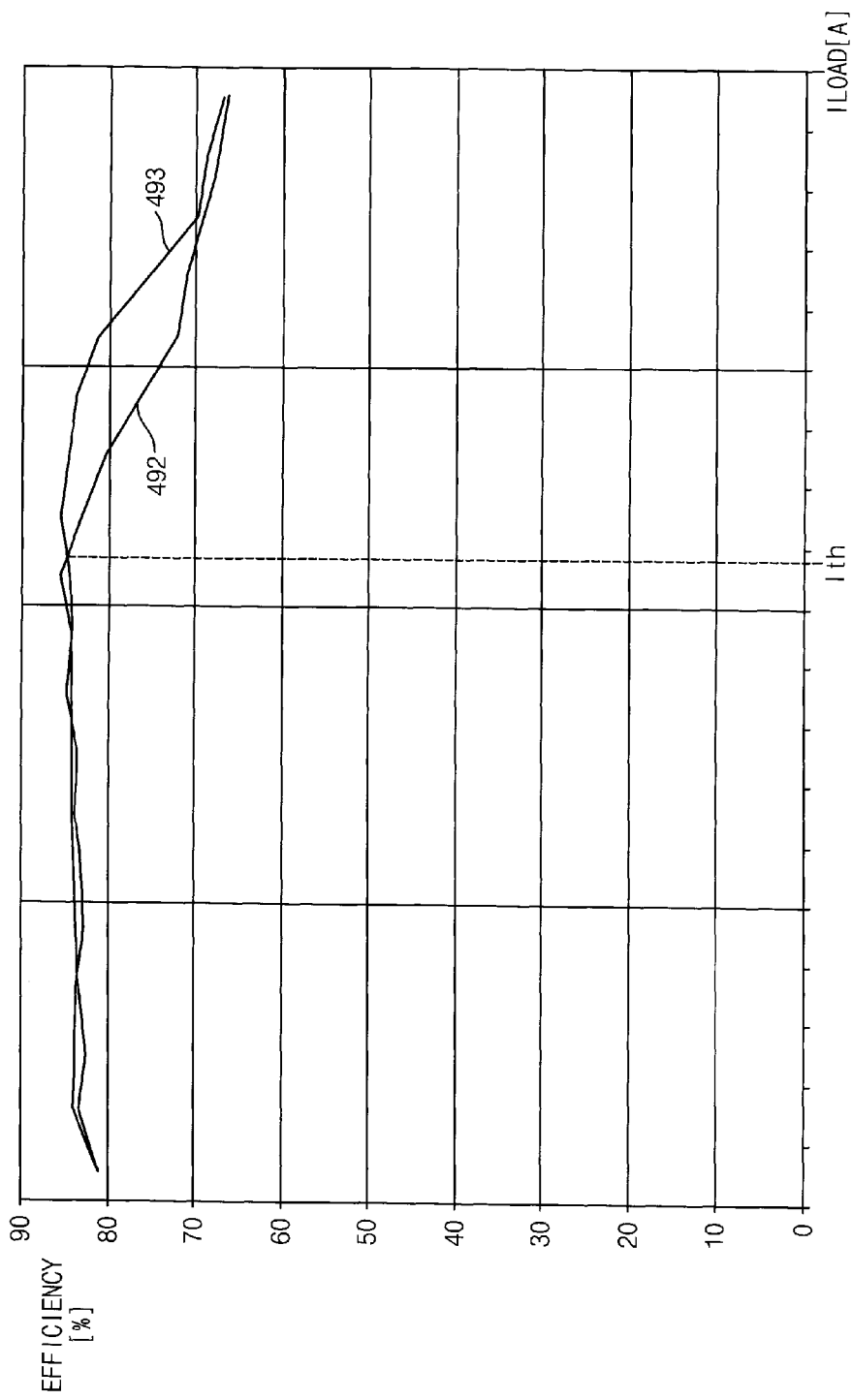
FIG. 17 is a graph illustrating a power transfer efficiency of the voltage converter according to some embodiments.

FIG. 17 is a graph illustrating a power transfer efficiency of the voltage converter according to some embodiments.

In FIG. 17, a reference numeral 493 denotes the efficiency of power transferred to the load in the PFM mode of the voltage converter 10 of FIG. 1, and a reference numeral 493 denotes the efficiency of power transferred to the load in the conventional voltage converter when the inductor current reaches its zero value.

Referring to FIG. 17, when the load current ILOAD is greater than a reference value Ith, the efficiency of the power transferred to the load in the PFM mode of the voltage converter 10 of FIG. 1 is higher than the efficiency of the power transferred to the load in the conventional voltage converter.

Figure 18:
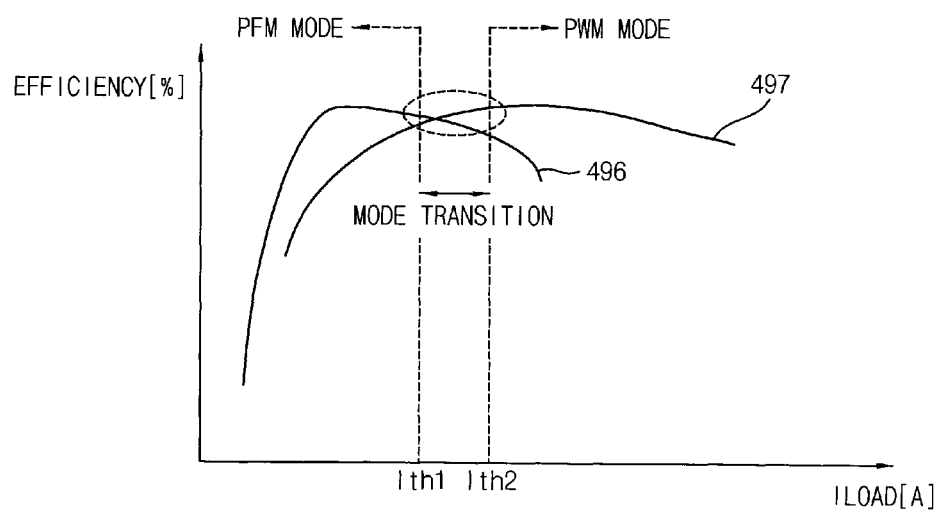
FIG. 18 is a graph for explaining operation of the voltage converter of FIG. 1.

FIG. 18 is a graph explaining an operation of the voltage converter of FIG. 1.

Referring to FIGS. 1 and 18, the voltage converter 10 operates in the PFM mode when the level of the load current ILOAD is lower than a first value Ith1, and the voltage converter 10 operates in the PWM mode when the level of the load current ILOAD is greater than a second value Ith2. When the voltage converter 10 operates in the PFM mode, the voltage converter 10 increases the inductor current IL by turning-on the first driving device 61 and turning-off the second driving device 63 using the off-timing control voltage VOFT in the switching control circuit 300 before the second sensing signal ZCD is activated. Therefore, the voltage converter 10 may increase an efficiency of power transferred to the load 50 in the PFM mode. In addition, the voltage converter 10 stably performs the mode transition based on the first and second sensing signals CSO and ZCD as described with reference to FIGS. 12 and 14, when the load current ILOAD is between the first and second values Ith1 and Ith2. Therefore, the voltage converter 10 may enhance an operating characteristic while increasing the efficiency of the power transferred to the load.

Figure 19:
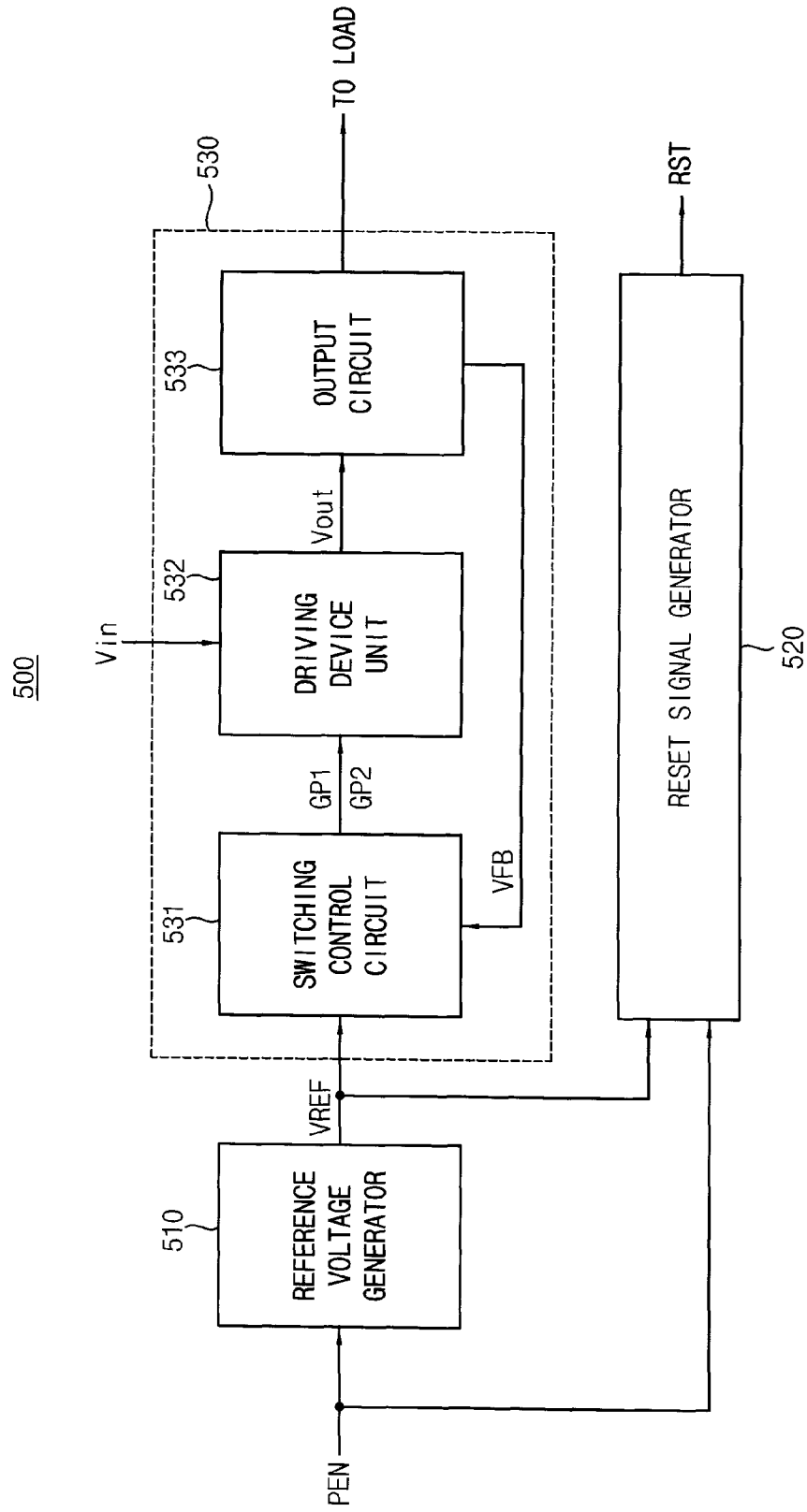
FIG. 19 is a block diagram illustrating a power management device, according to example embodiments.

FIG. 19 is a block diagram illustrating a power management device, according to example embodiments.

Referring to FIG. 19, a power management device 500 includes a reference voltage generator 510, a reset signal generator 520 and a voltage converter 530. The reference voltage generator 510 generates a reference voltage VREF based on a power enable signal PEN. Although not illustrated in FIG. 19, the reference voltage generator 510 may be implemented with resistors used as a voltage divider for generating the first reference voltage VREF. In case a more stable reference voltage is required, the reference voltage generator 510 may be implemented with a band-gap reference voltage circuit. As known to one of ordinary skill in the art, the band-gap reference voltage circuit can provide a stable reference voltage that is insensitive to a temperature variation. The band-gap reference voltage circuit may include a start-up circuit, at least one transistor, at least one resistor, etc.

The reset signal generator 520 generates a reset signal RST based on the power enable signal PEN and the reference voltage VREF. Although not illustrated in FIG. 19, the reset signal generator 520 may include a reset enable unit, a reset disable unit and a latch unit. The reset enable unit generates a reset enable signal based on the power enable signal PEN. The reset disable unit generates a reset disable signal based on the first reference voltage VREF and the reset enable signal. The latch unit generates the reset signal RST based on the reset enable signal and the reset disable signal.

As described with reference to FIGS. 1 through 18, the voltage converter 530 increases the inductor current by turning on the first driving device and turning off the second driving device using the off-timing control voltage in the switching control circuit before the second sensing signal is activated. Therefore, the voltage converter may increase an efficiency of power transferred to the load in the PFM mode. In addition, the voltage converter 530 stably performs the mode transition based on the first and second sensing signals during a mode transition interval based on the first and second sensing signals.

The voltage converter 530 includes a switching control circuit 531, a switching device unit 532 and an output circuit 533. The switching control circuit 531 generates first and second driving control signals GP1 and GP2 which drive the driving device unit 532, and the driving device unit 532 converts an input power supply voltage to an output voltage Vout in response to the first and second driving control signals GP1 and GP2. The output circuit 533 may include the capacitor C1 and the feedback unit 40 in FIG. 1, and may provide a load current to a load based on the output voltage Vout.

Figure 20:
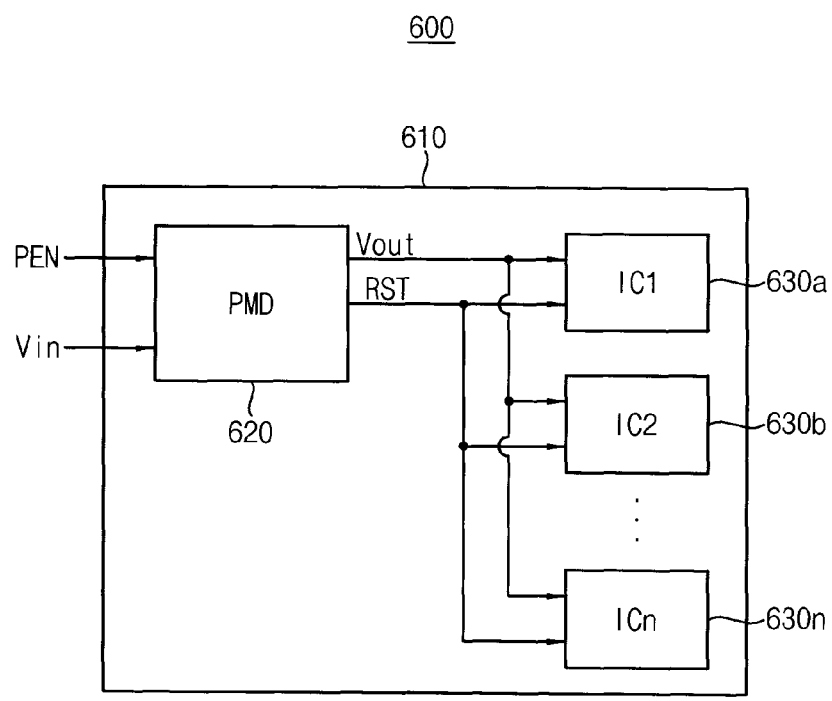
FIG. 20 is a block diagram illustrating a power management system, according to example embodiments.

FIG. 20 is a block diagram illustrating a power management system, according to example embodiments.

Referring to FIG. 20, a power management system 600 includes a power management device 620 and multiple integrated circuits 630a, 630b, . . . , 630n. The power management device 620 and the multiple integrated circuits 630a, 630b, . . . , 630n may be formed on a printed circuit board (PCB) 610.

The power management device 620 may be the power management device 500 shown in FIG. 19, for example. The power management device 620 generates an output voltage Vout based on the input power supply voltage Vin and generates a reset signal RST based on a power enable signal PEN.

The integrated circuits 630a, 630b, . . . , 6430n maintain a reset state based on the reset signal RST until the output power supply voltage Vout reaches a steady-state. After the output voltage Vout reaches the steady-state, the integrated circuits 630a, 630b, . . . , 630n are ready to operate and are driven based on the output voltage Vout.

Figure 21:
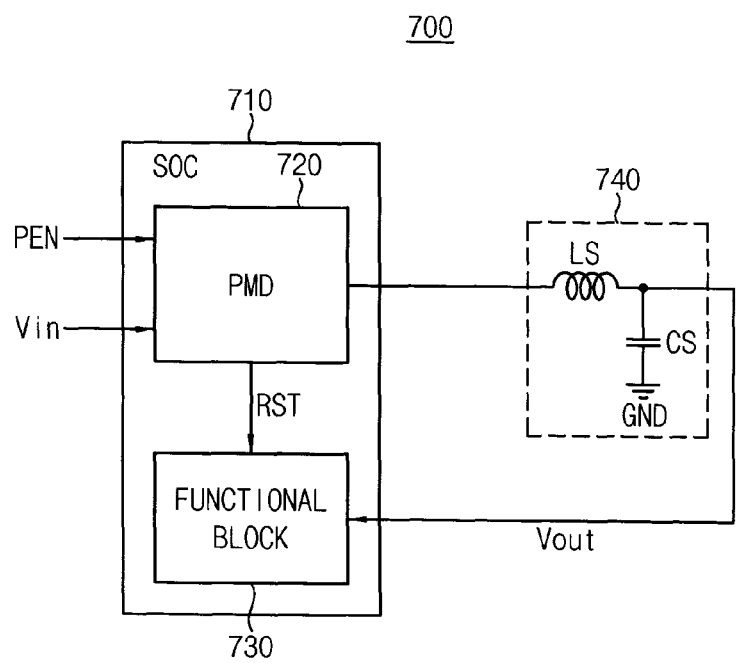
FIG. 21 is a block diagram illustrating the power management system, according to other example embodiments.

FIG. 21 is a block diagram illustrating a power management system, according to other example embodiments.

Referring to FIG. 21, a power management system 700 includes a system on chip (SoC) 710 and a filter 740. The SoC 710 includes a power management device 720 and a functional block 730.

The power management device 720 may be the power management device 500 of FIG. 19, for example. The power management device 720 generates an output current based on the input power supply voltage Vin and generates a reset signal RST based on a power enable signal PEN. The voltage converter included in the power management device 720 as described with reference to FIG. 1 increases the inductor current by turning on the first driving device and turning off the second driving device using the off-timing control voltage in the switching control circuit before the second sensing signal is activated. Therefore, the voltage converter may increase an efficiency of power transferred to the function block 730 in the PFM mode. In addition, the voltage converter stably performs the mode transition based on the first and second sensing signals during a mode transition interval based on the first and second sensing signals. Therefore, the power management device 720 may enhance an operating characteristic while increasing the efficiency of the power transferred to the functional block 730.

The filter 740 may be implemented as a low-pass filter having an inductor LS and a capacitor CS. A stable output voltage Vout is induced based on the output current flowing through the inductor LS.

The functional block 730 maintains a reset state based on the reset signal RST until the output power supply voltage VOUT reaches a steady-state. After the output voltage Vout reaches the steady-state, the functional block 730 is ready to operate and is driven based on the output voltage Vout.

Although FIG. 21 illustrates an example of the power management system 700 including the filter 740 disposed outside of the SoC 710, the filter 740 alternatively may be included inside the SoC 710.

Figure 22:
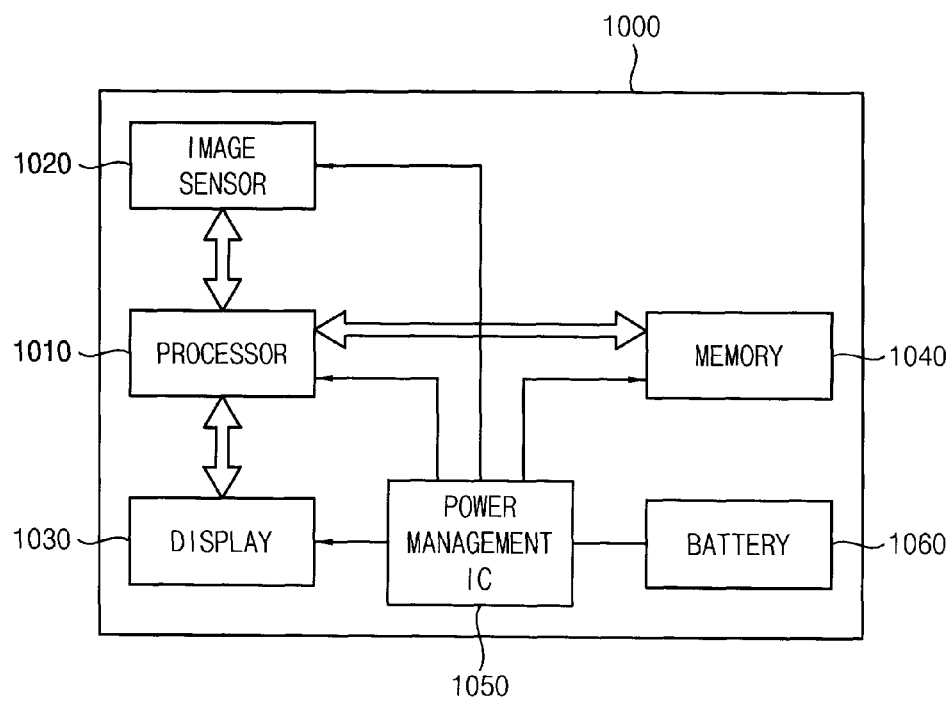
FIG. 22 is a block diagram illustrating an example of an electronic device including the voltage converter of FIG. 1 according to example embodiments.

FIG. 22 is a block diagram illustrating an example of an electronic device including the voltage converter of FIG. 1 according to example embodiments.

Referring to FIG. 22, an electronic device 1000 may be implemented as a personal computer (PC), a tablet computer, a net-book, an e-reader, a personal digital assistant (PDA), a portable multimedia player (PMP), an MP3 player, or an MP4 player. The electronic device 1000 includes a power management IC 1050 and a battery 1060.

The power management IC 1050 is provided power from the battery 1060, and may manage power of a processor 1010, an image sensor 1020, a memory 1040, or a display 1030. The power management IC 1050 includes the voltage converter 10 of FIG. 1. Therefore, the power management IC 1050 increases the inductor current by turning on the first driving device and turning off the second driving device using the off-timing control voltage in the switching control circuit before the second sensing signal is activated. Therefore, the voltage converter may increase an efficiency of power transferred to the load in the PFM mode. In addition, the power management IC 1050 stably performs the mode transition based on the first and second sensing signals during a mode transition interval. Therefore, the power management IC 1050 may enhance an operating characteristic while increasing an efficiency of power transferred to the load.

The image sensor 1020 of the electronic device 1000 may convert an optical signal into a digital signal. The converted digital signal may be stored to the memory 1040 or displayed through the display 1030 under the control of the processor 1010. Also, the digital signal stored to the memory 1040 may be displayed through the display 1030 under the control of the processor 1010.

Figure 23:
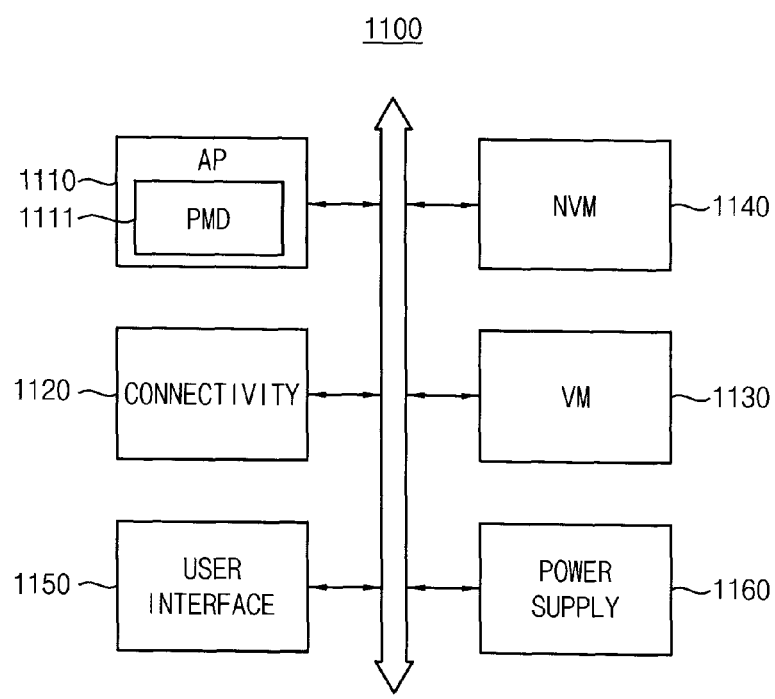
FIG. 23 is a block diagram illustrating a mobile system, according to example embodiments.

FIG. 23 is a block diagram illustrating a mobile system, according to example embodiments.

Referring to FIG. 23, a mobile system 1100 includes an application processor 1110, a connectivity unit 1120, a volatile memory device 1130, a nonvolatile memory device 1140, a user interface 1150 and a power supply 1160. According to various embodiments, the mobile system 1100 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 1110 may execute applications, such as a web browser, a game application, a video player, etc. The application processor 1110 may include a power management device 1111. The power management device 1111 includes the voltage converter 10 of FIG. 1. The voltage converter increases the inductor current by turning on the first driving device and turning off the second driving device using the off-timing control voltage in the switching control circuit before the second sensing signal is activated. Therefore, the voltage converter may increase an efficiency of power transferred to the load in the PFM mode. In addition, the voltage converter stably performs the mode transition based on the first and second sensing signals during a mode transition interval based in the first and second sensing signals.

The connectivity unit 1120 may perform wired or wireless communications with an external device. For example, the connectivity unit 1120 may perform an Ethernet communication, a near field communication (NFC), a radio frequency identification (RFID) communication, a mobile telecommunication, a memory card communication, a universal serial bus (USB) communication, etc. In some embodiments, the connectivity unit 1120 may include a baseband chipset that supports the communications, such as a global system for mobile communications (GSM), a general packet radio service (GPRS), a wideband code division multiple access (WCDMA), a high speed downlink/uplink packet access (HSxPA), etc.

The volatile memory device 1130 may store data processed by the application processor 1110, or may operate as a working memory. For example, the volatile memory device 1130 may be a dynamic random access memory, such as DDR SDRAM, LPDDR SDRAM, GDDR SDRAM, RDRAM, etc., or may be any volatile memory device that requires a refresh operation.

The nonvolatile memory device 1140 may store a boot image for booting the mobile system 1100. For example, the nonvolatile memory device 1140 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1150 may include at least one input device, such as a keypad, a touch screen, etc., and at least one output device, such as a speaker, a display device, etc. The power supply 1160 may supply a power supply voltage to the mobile system 1100. In some embodiments, the mobile system 1100 may further include a camera image processor (CIS), and/or a storage device, such as a memory card, a solid state drive (SSD), a hard disk drive (HDD), a CD-ROM, etc.

In some embodiments, the mobile system 1100 and/or components of the mobile system 1100 may be packaged in various forms, such as a package on package (PoP), ball grid arrays (BGAs), chip scale packages (CSPs), a plastic leaded chip carrier (PLCC), plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

Figure 24:
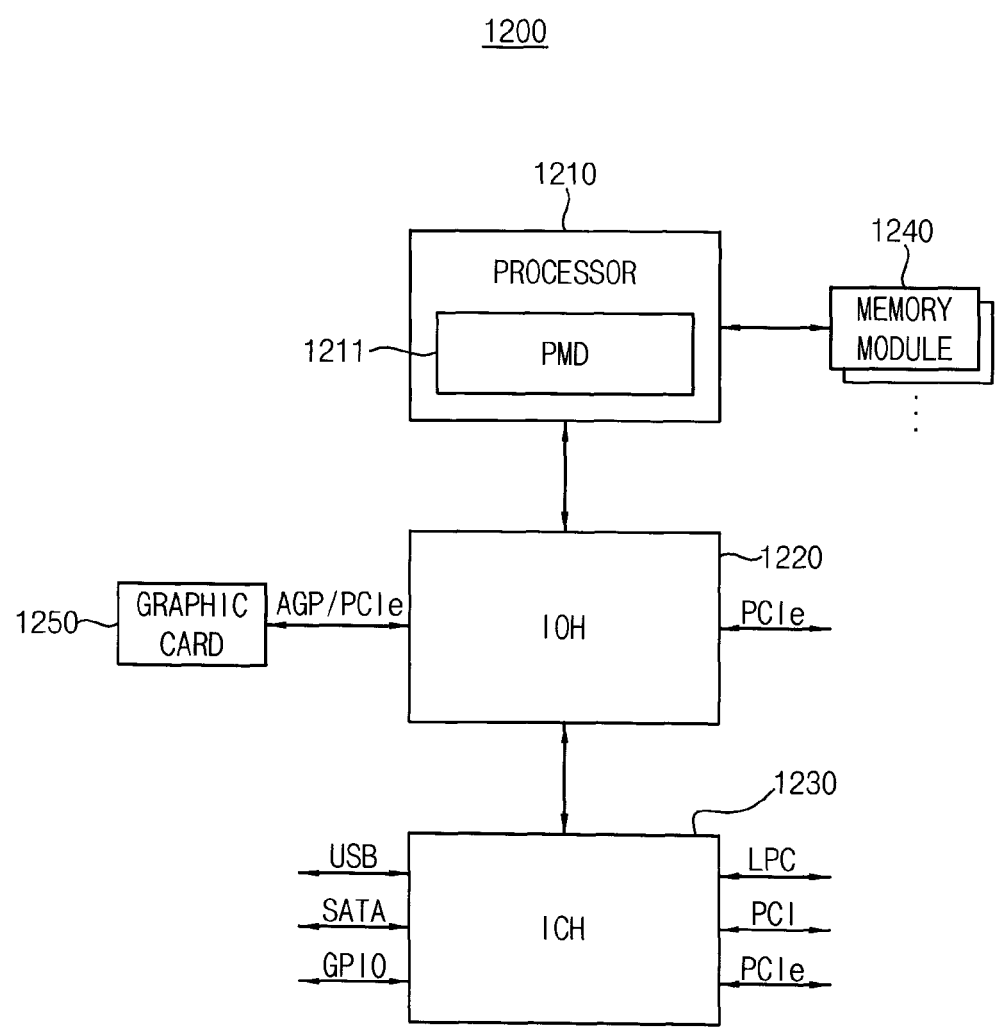
FIG. 24 is a block diagram illustrating a computing system including the power management device of FIG. 19 according to example embodiments.

FIG. 24 is a block diagram illustrating a computing system including the power management device of FIG. 19 according to example embodiments.

Referring to FIG. 24, a computing system 1200 includes a processor 1210, an input/output hub (IOH) 1220, an input/output controller hub (ICH) 1230, at least one memory module 1240 and a graphics card 1250. In some embodiments, the computing system 1200 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 1210 may perform various computing functions, such as executing specific software for performing specific calculations or tasks. For example, the processor 1210 may be a microprocessor, a central process unit (CPU), a digital signal processor, or the like. The processor 1210 may include a power management device 1211. The power management device 1211 generates an output voltage according to the characteristic of the load based on an input power supply voltage, and the power management device 1211 includes the voltage converter 10 of FIG. 1. The voltage converter increases the inductor current by turning on the first driving device and turning off the second driving device using the off-timing control voltage in the switching control circuit before the second sensing signal is activated. Therefore, the voltage converter may increase an efficiency of power transferred to the load in the PFM mode. In addition, the voltage converter stably performs the mode transition based on the first and second sensing signals during a mode transition interval based in the first and second sensing signals.

In some embodiments, the processor 1210 may include a single core or multiple cores. For example, the processor 1210 may be a multi-core processor, such as a dual-core processor, a quad-core processor, a hexa-core processor, etc. Although FIG. 24 illustrates the computing system 1200 including one processor 1210, in some embodiments, the computing system 1200 may include a plurality of processors. The processor 1210 may include an internal or external cache memory.

The processor 1210 may include a memory controller for controlling operations of the memory module 1240. The memory controller included in the processor 1210 may be referred to as an integrated memory controller (IMC). The memory controller may include structure and/or perform the methods of one or more of the embodiments described herein. A memory interface between the memory controller and the memory module 1240 may be implemented with a single channel including a plurality of signal lines, or may be implemented with multiple channels. At least one memory module 1240 may be coupled to each of the multiple channels. In some embodiments, the memory controller may be located inside the input/output hub 1220, which may be referred to as a memory controller hub (MCH).

The input/output hub 1220 may manage data transfer between the processor 1210 and devices, such as the graphics card 1250. The input/output hub 1220 may be coupled to the processor 1210 via various interfaces. For example, the interface between the processor 1210 and the input/output hub 1220 may be a front side bus (FSB), a system bus, a HyperTransport, a lightning data transport (LDT), a Quick-Path interconnect (QPI), a common system interface (CSI), etc. Although FIG. 24 illustrates the computing system 1200 including one input/output hub 1220, in some embodiments, the computing system 1200 may include a plurality of input/output hubs. The input/output hub 1220 may provide various interfaces with the devices. For example, the input/output hub 1220 may provide an accelerated graphics port (AGP) interface, a peripheral component interface-express (PCIe), a communications streaming architecture (CSA) interface, etc.

The graphics card 1250 may be coupled to the input/output hub 1220 via the AGP interface or the PCIe. The graphics card 1250 may control a display device (not shown) for displaying an image. The graphics card 1250 may include an internal processor for processing image data and an internal memory device. In some embodiments, the input/output hub 1220 may include an internal graphics device along with or instead of the graphics card 1250 that is disposed outside the input/output hub 1220. The graphics device included in the input/output hub 1220 may be referred to as integrated graphics. Further, the input/output hub 1220 including the internal memory controller and the internal graphics device may be referred to as a graphics and memory controller hub (GMCH).

The input/output controller hub 1230 may perform data buffering and interface arbitration to efficiently operate various system interfaces. The input/output controller hub 1230 may be coupled to the input/output hub 1220 via an internal bus, such as a direct media interface (DMI), a hub interface, an enterprise Southbridge interface (ESI), PCIe, etc. The input/output controller hub 1230 may provide various interfaces with peripheral devices. For example, the input/output controller hub 1230 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 1210, the input/output hub 1220 and the input/output controller hub 1230 may be implemented as separate chipsets or separate integrated circuits. In other embodiments, at least two among the processor 1210, the input/output hub 1220 and the input/output controller hub 1230 may be implemented as a single chipset.

As mentioned above, according to example embodiments, the voltage converter increases the inductor current by turning on the first driving device and turning off the second driving device using the off-timing control voltage in the switching control circuit before the second sensing signal is activated. Therefore, the voltage converter may increase an efficiency of power transferred to the load in the PFM mode. In addition, the voltage converter stably performs the mode transition based on the first and second sensing signals during a mode transition interval based in the first and second sensing signals.

The above described embodiments may be applied to an integrated circuit and/or an electronic system that require a higher power transfer efficiency and a stable mode transition. For example, the above described embodiments may be applied to a power management device that supplies power to an SoC.

While the present disclosure has been described with reference to example embodiments, it will be apparent to those skilled in the art that various changes and modifications may be made without departing from the spirit and scope of the present invention. Therefore, it should be understood that the above embodiments are not limiting, but illustrative.

What is claimed is:

1. A voltage converter comprising:
a driving device configured to charge an input power supply voltage in an inductor in response to a first driving control signal, the inductor being connected between a switching node and an output node, and the driving device being configured to discharge the inductor in response to a second driving control signal;
a current sensing unit configured to generate first and second sensing signals based on a first sensed current, a second sensed current, a voltage at the switching node and a ground voltage, the first sensed current being based on a current which is responsive to the input power supply voltage, the second sensed current being inversely proportional to an inductor current flowing through the inductor, the first sensing signal representing the inductor current, the second sensing signal indicating a zero value of the inductor current; and
a switching control circuit configured to generate the first and second driving control signals by performing a pulse-frequency modulation (PFM) and a pulse-width modulation (PWM) based on a feedback voltage, the first sensing signal and the second sensing signal, the feedback voltage being obtained by dividing an output voltage at the output node,
the switching control circuit including,
a feedback voltage selector configured to receive the first sensing signal to select a providing path of the feedback voltage according to a peak value of the first sensing signal;
a PWM unit configured to receive a first reference voltage, the feedback voltage and
the first sensing signal, the PWM unit being configured to perform the PWM according to a difference between the first reference voltage and the feedback voltage to generate a first pulse signal;
a PFM unit configured to receive the first reference voltage and the feedback voltage,
the PFM unit being configured to perform the PFM according to the difference between the first reference voltage and the feedback voltage to generate a second pulse signal;
a first level detector configured to receive the first sensing signal to generate a peak pulse signal which is activated when the peak value of the first sensing signal is detected;
an off-time controller configured to provide the PFM unit with an off-timing control voltage that adjusts a frequency of the second pulse signal;
a mode controller configured to select one of the first and second pulse signals according to an operation mode based on the first and second sensing signals; and
a driving controller configured to determine on and off timings of the first and
second driving control signals based on a selected pulse signal of the mode controller,
wherein the switching control circuit is configured to adaptively adjust an off-time when the PFM unit of the switching control circuit performs the PFM, the first driving control signal being deactivated during the off-time.

2. The voltage converter of claim 1, wherein the switching control circuit operates in a PFM mode when the peak value of the first sensing signal is less than a reference value.

3. The voltage converter of claim 1, wherein the switching control circuit operates in a PWM mode when the peak value of the first sensing signal is equal to or greater than a reference value.

4. The voltage converter of claim 1, wherein the current sensing unit comprises:
a current sensor configured to generate the first sensing signal based on the first and
second sensed currents; and
a zero-current detector configured to generate the second sensing signal based on a first voltage signal corresponding to the voltage at the switching node and a second voltage signal having a level of the ground voltage.

5. The voltage converter of claim 4, wherein the current sensor comprises:
a peak current sensor configured to generate a peak current detection signal based on the first and second sensed current; and
a buffer configured to receive the peak current detection signal, configured to buffer the peak current detection signal, and configured to provide the first sensing signal.

6. The voltage converter of claim 4, wherein the zero-current detector is configured to amplify a difference between the first and second voltage signals to provide the second sensing signal.

7. The voltage converter of claim 1, wherein the PFM unit adaptively is configured to adjust the frequency of the second pulse based on the off-timing control voltage and the first sensing signal in a PFM mode.

8. The voltage converter of claim 1, wherein the PFM unit comprises:
a first comparator configured to compare the feedback voltage and the first reference voltage to output a first error voltage;
a second comparator configured to compare the first sensing signal and a second reference voltage to output a second error voltage;
an OR gate configured to perform an OR operation on the first error voltage, the off-timing control voltage and the second sensing signal;
a flip-flop including a reset terminal for receiving an output of the OR gate, a set terminal for receiving the second error voltage and an output terminal for providing an output signal; and
a driver configured to provide the second pulse signal based on the output signal and
the second sensing signal.

9. The voltage converter of claim 8, wherein the flip-flop resets the output signal in response to a falling edge of the output of the OR gate.

10. The voltage converter of claim 8, wherein the driver is configured to provide the second pulse signal having a logic level according to a logic level of the output signal, and
the driver is configured to output the second pulse signal with a low level when the second sensing signal is a high level.

11. The voltage converter of claim 1, wherein the off-time controller is configured to provide the PFM unit with the off-timing control voltage when the peak value of the inductor current is detected in a PFM mode, the off-timing control voltage being activated before the zero-current is detected.

12. The voltage converter of claim 11, wherein the off-time controller comprises:
a scaling current providing unit configured to provide a scaling current to a connection node in response to a plurality of first switching signals based on a dynamic voltage scaling code when the peak value of the inductor current is detected; and
a hysteresis comparator connected to the connection node, the hysteresis comparator being configured to compare a scaling voltage corresponding to the scaling current and a second reference voltage to provide the off-timing control voltage.

13. The voltage converter of claim 11, wherein the off-timing controller further comprises an offset current providing unit configured to selectively provide an offset current to a connection node in response to a plurality of second switching signals based on a clock signal.

14. The voltage converter of claim 1, wherein the mode controller comprises:
a second level detector configured to provide a level detection signal which is activated based on a level of the first sensing signal;
a mode signal generator configured to provide a mode signal which synchronizes with the level detection signal; and
a mode trigger configured to receive the level detection signal and the second sensing signal to generate a mode transition trigger signal that is activated either when the level of the second sensing signal is lower than a reference value during a reference time, or when a state of the second sensing signal is maintained.

15. The voltage converter of claim 14, wherein the mode signal generator is configured to reset the mode signal in response to an activated mode transition trigger signal.

16. The voltage converter of claim 1, wherein the driving device comprises:
a first driving device configured to charge the input power supply voltage in the response to the first driving control signal; and
a second driving device configured to discharge the inductor in response to the second driving control signal.

17. The voltage converter of claim 16, wherein the first and second driving devices are turned on/off complementarily to each other.

18. A voltage converter comprising:
a driving device configured to charge an input power supply voltage in an inductor in response to a first driving control signal, the inductor being connected between a switching node and an output node, and the driving device being configured to discharge the inductor in response to a second driving control signal;
a current sensing unit configured to generate first and second sensing signals based on a first sensed current, a second sensed current, a voltage at the switching node and a ground voltage, the first sensed current being based on a current which is responsive to the input power supply voltage, the second sensed current being based on an inductor current flowing through the inductor; and
a switching control circuit configured to generate the first and second driving control signals by performing a pulse-frequency modulation (PFM) and a pulse-width modulation (PWM) based on a feedback voltage, a reference voltage, the first sensing signal and the second sensing signal, the feedback voltage being based on an output voltage at the output node, the switching control circuit being configured to adaptively adjust an off-time when the switching control circuit performs the PFM, the first driving control signal being deactivated during the off-time, the switching control circuit including, a feedback voltage selector configured to receive the first sensing signal to select a providing path of the feedback voltage according to a peak value of the first sensing signal;

a PWM unit configured to receive a first reference voltage, the feedback voltage and the first sensing signal, the PWM unit being configured to perform the PWM according to a difference between the first reference voltage and the feedback voltage to generate a first pulse signal;

a PFM unit configured to receive the first reference voltage and the feedback voltage, the PFM unit being configured to perform the PFM according to the difference between the first reference voltage and the feedback voltage to generate a second pulse signal;

a first level detector configured to receive the first sensing signal to generate a peak pulse signal which is activated when the peak value of the first sensing signal is detected;

an off-time controller configured to provide the PFM unit with an off-timing control voltage that adjusts a frequency of the second pulse signal;

a mode controller configured to select one of the first and second pulse signals according to an operation mode based on the first and second sensing signals; and a driving controller configured to determine on and off timings of the first and second driving control signals based on a selected pulse signal of the mode controller.

\* \* \* \* \*